(12) United States Patent
Palin et al.

(10) Patent No.: US 9,338,638 B1
(45) Date of Patent: May 10, 2016

(54) METHOD, APPARATUS, AND COMPUTER PROGRAM PRODUCT FOR WIRELESS DEVICE AND SERVICE DISCOVERY

(71) Applicant: Nokia Technologies Oy, Espoo (FI)

(72) Inventors: Arto Palin, Viiala (FI); Jukka Reunamaki, Tampere (FI); Juha Salokannel, Tampere (FI); Teemu Savolainen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/721,427

(22) Filed: May 26, 2015

(51) Int. Cl.
*H04W 12/08* (2009.01)
*H04W 8/20* (2009.01)
*H04W 8/00* (2009.01)
*H04W 4/00* (2009.01)

(52) U.S. Cl.
CPC .............. *H04W 8/205* (2013.01); *H04W 4/008* (2013.01); *H04W 8/005* (2013.01); *H04W 12/08* (2013.01)

(58) Field of Classification Search
CPC ................... H04L 29/08108; H04M 2207/18; H04W 4/02; H04W 8/18; H04W 4/008; H04W 8/005; H04W 8/205; H04W 12/08; G06Q 30/02
See application file for complete search history.

(56) References Cited

U.S. PATENT DOCUMENTS

| | | | |
|---|---|---|---|
| 8,620,379 B2 | 12/2013 | Zhodzishsky et al. | |
| 9,008,917 B2 | 4/2015 | Gautama | |
| 2006/0046736 A1 | 3/2006 | Pering et al. | |
| 2007/0061396 A1* | 3/2007 | Morris | G06Q 10/02 709/203 |
| 2012/0011020 A1* | 1/2012 | Saedifaez | G06Q 10/06 705/26.5 |
| 2014/0065967 A1 | 3/2014 | Shen | |
| 2014/0141714 A1* | 5/2014 | Ghosh | H04L 29/08 455/39 |
| 2014/0302849 A1 | 10/2014 | Palin et al. | |
| 2014/0315491 A1 | 10/2014 | Preiszler et al. | |

* cited by examiner

*Primary Examiner* — Ted Wang
(74) *Attorney, Agent, or Firm* — Locke Lord LLP

(57) ABSTRACT

In an example embodiment, a method for short service discovery includes establishing a connection, by an apparatus, with a wireless device having a subset of service information available as default service information; transmitting, by the apparatus, a request for additional service information available from the wireless device; receiving, by the apparatus, from the wireless device, additional service information available from the wireless device, if the request is authorized by the wireless device; and receiving, by the apparatus, from the wireless device, a subset of service information available from the wireless device, if the request is not authorized by the wireless device.

19 Claims, 16 Drawing Sheets

GATT INFO TABLE

FIG. 4B   BTLE ADVERTISING MESSAGE

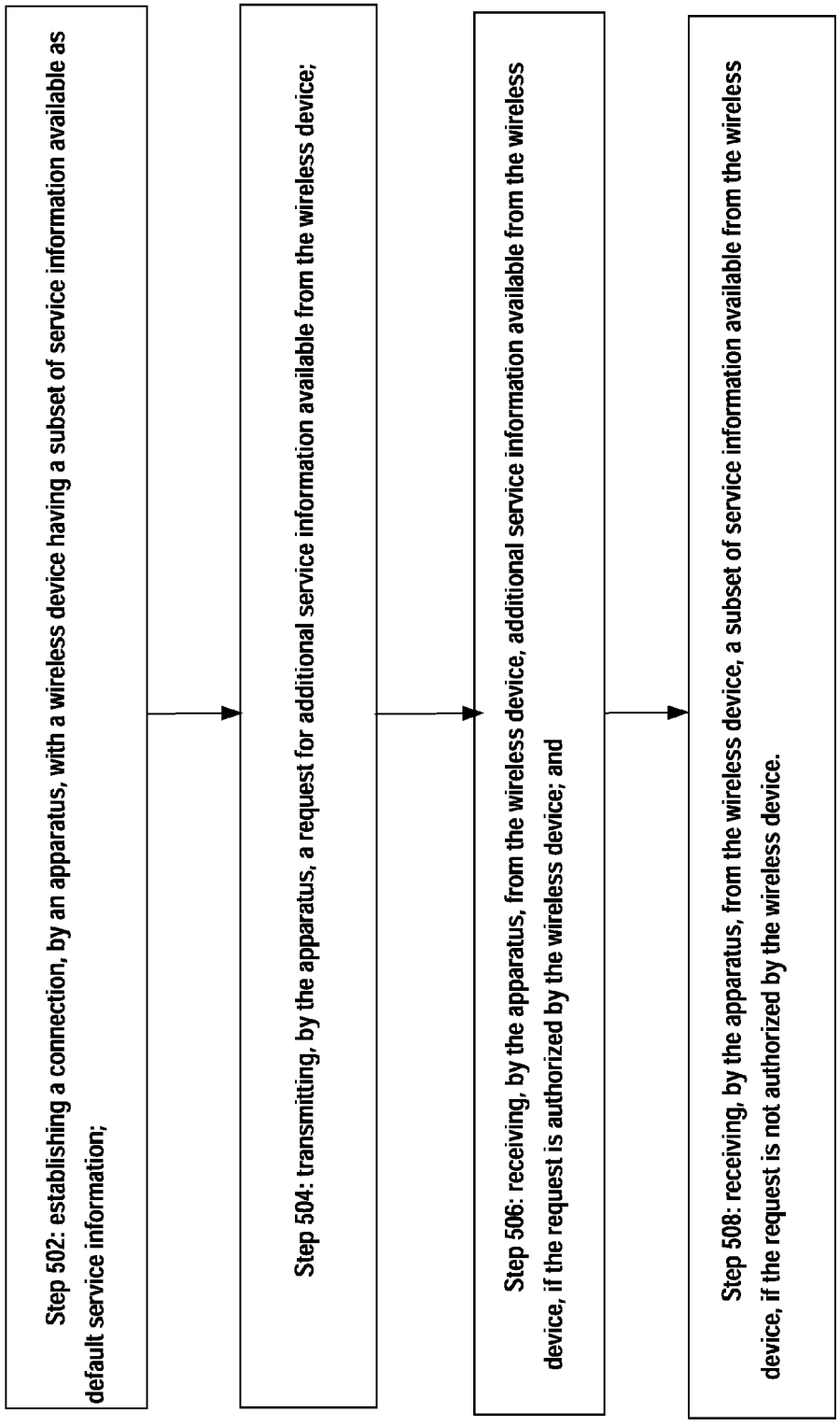

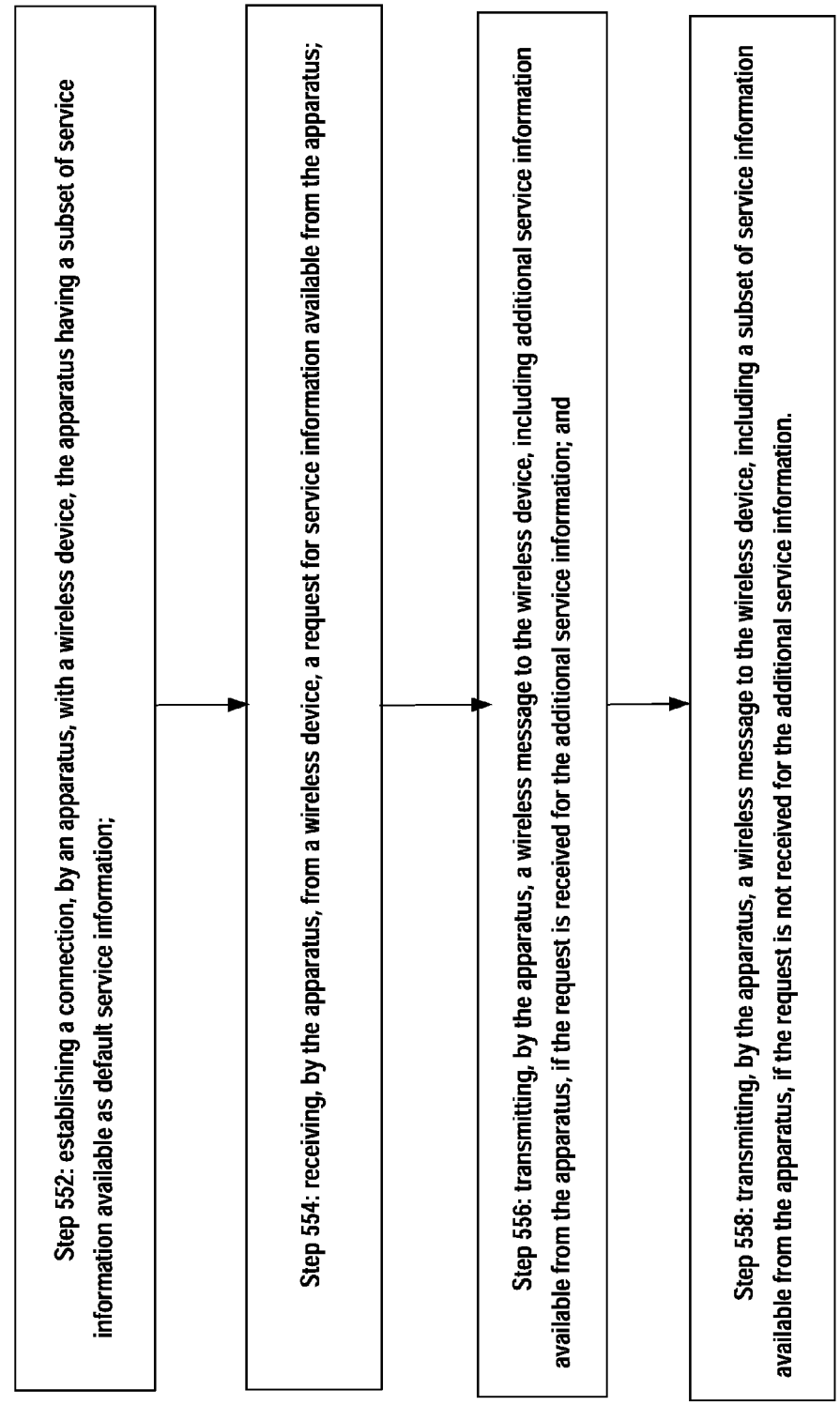

FIG. 5B
SERVER DEVICE 102

Step 552: establishing a connection, by an apparatus, with a wireless device, the apparatus having a subset of service information available as default service information;

Step 554: receiving, by the apparatus, from a wireless device, a request for service information available from the apparatus;

Step 556: transmitting, by the apparatus, a wireless message to the wireless device, including additional service information available from the apparatus, if the request is received for the additional service information; and Step 558: transmitting, by the apparatus, a wireless message to the wireless device, including a subset of service information available from the apparatus, if the request is not received for the additional service information.

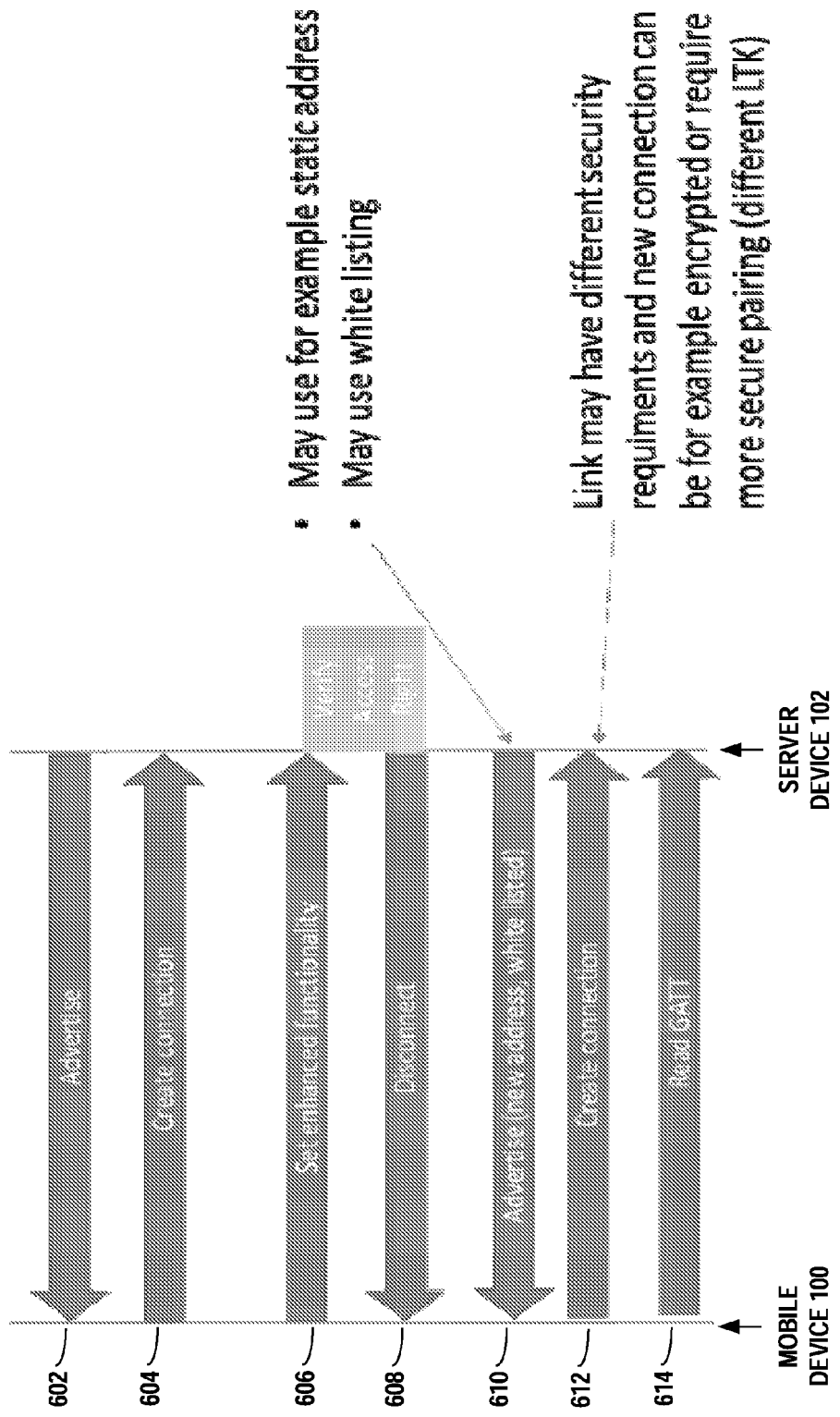

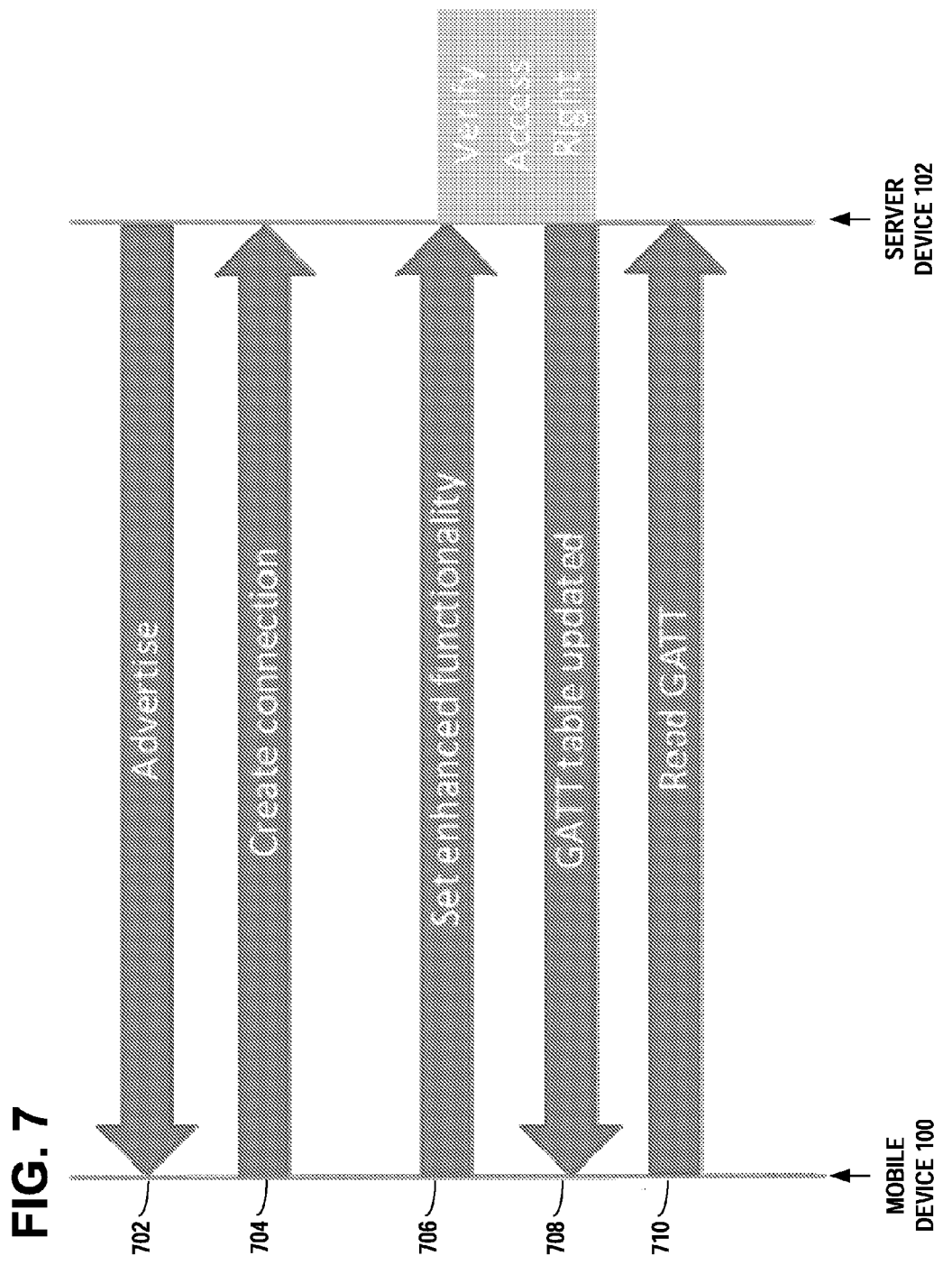

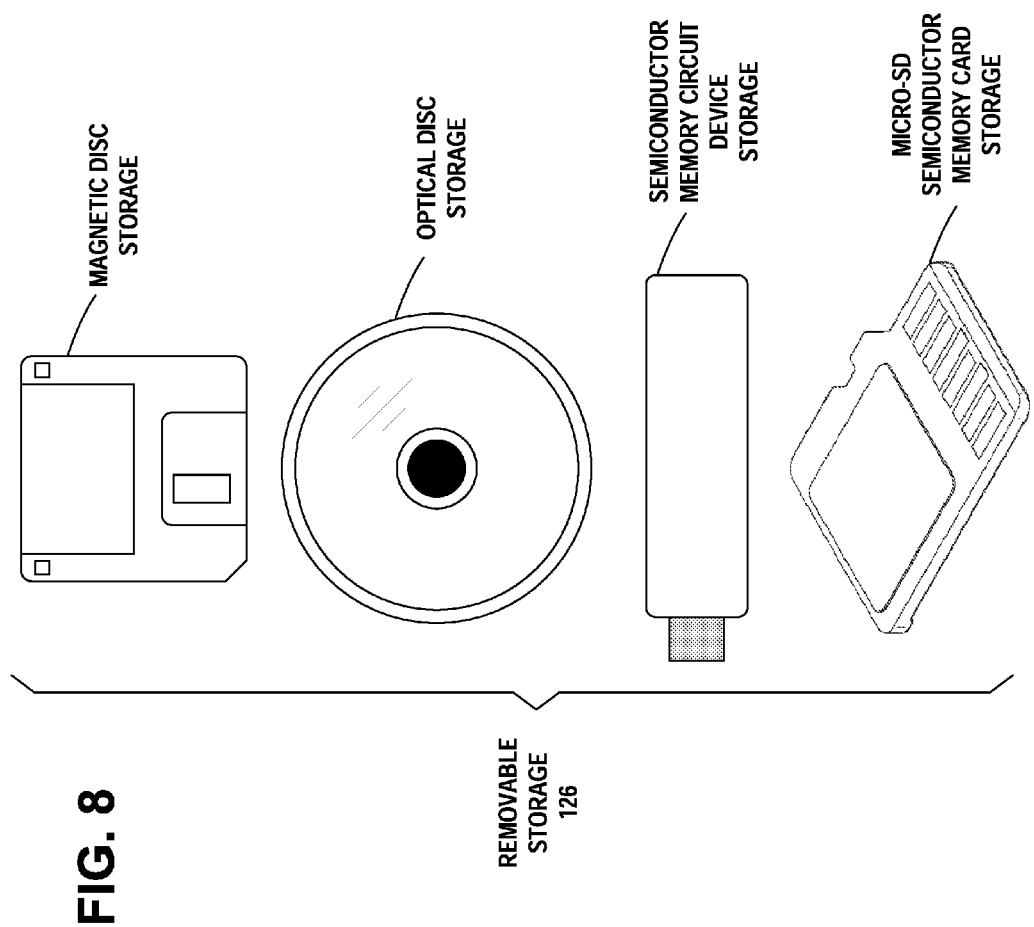

US 9,338,638 B1

METHOD, APPARATUS, AND COMPUTER PROGRAM PRODUCT FOR WIRELESS DEVICE AND SERVICE DISCOVERY

FIELD

The technology field relates to wireless device and service discovery.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. The Bluetooth™ Core Specification, Version 4.2, Bluetooth™ SIG, Dec. 2, 2014 (incorporated herein by reference), describes the Bluetooth™ protocol (BT) and the Bluetooth™ Low Energy protocol (BLE).

SUMMARY

Method, apparatus, and computer program product example embodiments enhance wireless device discovery.

An example embodiment of the invention includes a method comprising:

establishing a connection, by an apparatus, with a wireless device having a subset of service information available as default service information;

transmitting, by the apparatus, a request for additional service information available from the wireless device;

receiving, by the apparatus, from the wireless device, additional service information available from the wireless device, if the request is authorized by the wireless device; and receiving, by the apparatus, from the wireless device, a subset of service information available from the wireless device, if the request is not authorized by the wireless device.

An example embodiment of the invention includes a method comprising:

wherein the wireless device is programmed to provide additional service information to a requester, if an authorized request or connection for additional service information is made;

receiving, by the apparatus, from the wireless device, additional service information available from the wireless device, if an authorized request or connection is made by the apparatus for additional service information; and receiving, by the apparatus, from the wireless device, a subset of service information available from the wireless device, if an authorized request or connection is not made by the apparatus for additional service information.

An example embodiment of the invention includes a method comprising:

wherein the authorized request is indicated by at least one of device level authentication and application level authorization.

An example embodiment of the invention includes a method comprising:

moving, by the apparatus, to a position within a touch distance from a location of the wireless device; and triggering, by the apparatus, a request to the wireless device, for additional service information, in response to moving to the position within the touch distance.

An example embodiment of the invention includes a method comprising:

wherein the wireless device is programmed to provide additional service information to a requester, if an authorized request or connection for the additional service information is made;

providing, by the apparatus, to the wireless device, an indication that the apparatus is authorized to request additional service information;

moving, by the apparatus, to a position within a touch distance from a location of the wireless device; and triggering, by the apparatus, an authorization to the wireless device, for additional service information, in response to moving to the position within the touch distance.

An example embodiment of the invention includes a method comprising:

wherein the authorized request is indicated by at least one of device level authentication and application level authorization.

An example embodiment of the invention includes a method comprising:

wherein the additional service information is a Bluetooth Generic Attribute Profile table of service information and the wireless device discovery messages from the wireless device are Bluetooth Low Energy advertising messages.

An example embodiment of the invention includes a method comprising:

creating, by the apparatus, a wireless communications connection with the wireless device, in response to receiving the wireless device discovery messages;

indicating, by the apparatus, to the wireless device, the request for additional service information available from the wireless device;

disconnecting, by the apparatus, the wireless communications connection with the wireless device;

receiving, by the apparatus, second wireless device discovery messages from the wireless device, which include a new address for the wireless device;

creating, by the apparatus, a second wireless communications connection with the wireless device, in response to receiving the second wireless device discovery messages; and receiving, by the apparatus, from the wireless device, the additional service information available from the wireless device, in response to the indicating.

An example embodiment of the invention includes a method comprising:

creating, by the apparatus, a wireless communications connection with the wireless device, in response to receiving the wireless device discovery messages;

indicating, by the apparatus, to the wireless device, the request for additional service information available from the wireless device; and receiving, by the apparatus, from the wireless device, the additional service information available from the wireless device, in response to the indicating.

An example embodiment of the invention includes a method comprising:

establishing a connection, by an apparatus, with a wireless device, the apparatus having a subset of service information available as default service information;

receiving, by the apparatus, from a wireless device, a request for service information available from the apparatus;

transmitting, by the apparatus, a wireless message to the wireless device, including additional service information available from the apparatus, if the request is received for the additional service information; and transmitting, by the apparatus, a wireless message to the wireless device, including a subset of service information available from the apparatus, if the request is not received for the additional service information.

An example embodiment of the invention includes a method comprising:

wherein the apparatus is programmed to provide additional service information to a requester, if an authorized request or connection for the additional service information is received;

transmitting, by the apparatus, the additional service information to the wireless device, in response to receiving an authorized request or connection for the additional service information; and transmitting, by the apparatus, a subset of service information to the wireless device, in response to receiving an unauthorized request or connection for the additional service information.

An example embodiment of the invention includes a method comprising:

wherein the authorized request is indicated by at least one of device level authentication and application level authorization.

An example embodiment of the invention includes a method comprising:

wherein the additional service information is a Bluetooth Generic Attribute Profile table of service information and the wireless device discovery messages from the wireless device are Bluetooth Low Energy advertising messages.

An example embodiment of the invention includes an apparatus comprising:

at least one processor;

at least one memory including computer program code;

the at least one memory and the computer program code configured to, with the at least one processor, cause the apparatus at least to:

establish a connection with a wireless device having a subset of service information available as default service information;

transmit a request for additional service information available from the wireless device;

receive from the wireless device, additional service information available from the wireless device, if the request is authorized by the wireless device; and receive from the wireless device, a subset of service information available from the wireless device, if the request is not authorized by the wireless device.

An example embodiment of the invention includes an apparatus comprising:

wherein the wireless device is programmed to provide additional service information to a requester, if an authorized request or connection for additional service information is made;

the at least one memory and the computer program code configured to, with the at least one processor, cause the apparatus at least to:

receive from the wireless device, additional service information available from the wireless device, if an authorized request or connection is made by the apparatus for additional service information; and receive from the wireless device, a subset of service information available from the wireless device, if an authorized request or connection is not made by the apparatus for additional service information.

An example embodiment of the invention includes an apparatus comprising:

wherein the authorized request is indicated by at least one of device level authentication and application level authorization.

An example embodiment of the invention includes an apparatus comprising:

wherein the additional service information is a Bluetooth Generic Attribute Profile table of service information and the wireless device discovery messages from the wireless device are Bluetooth Low Energy advertising messages.

An example embodiment of the invention includes an apparatus comprising:

at least one processor;

at least one memory including computer program code;

the at least one memory and the computer program code configured to, with the at least one processor, cause the apparatus at least to:

establish a connection with a wireless device, the apparatus having a subset of service information available as default service information;

receive from a wireless device, a request for service information available from the apparatus;

transmit a wireless message to the wireless device, including additional service information available from the apparatus, if the request is received for the additional service information; and transmit a wireless message to the wireless device, including a subset of service information available from the apparatus, if the request is not received for the additional service information.

An example embodiment of the invention includes an apparatus comprising:

wherein the apparatus is programmed to provide additional service information to a requester, if an authorized request or connection for the additional service information is received;

the at least one memory and the computer program code configured to, with the at least one processor, cause the apparatus at least to:

transmit the additional service information to the wireless device, in response to receiving an authorized request or connection for the additional service information; and transmit a subset of service information to the wireless device, in response to receiving an unauthorized request or connection for the additional service information.

An example embodiment of the invention includes an apparatus comprising:

wherein the authorized request is indicated by at least one of device level authentication and application level authorization.

An example embodiment of the invention includes an apparatus comprising:

wherein the additional service information is a Bluetooth Generic Attribute Profile table of service information and the wireless device discovery messages transmitted by the apparatus are Bluetooth Low Energy advertising messages.

An example embodiment of the invention includes a computer program product comprising computer executable program code recorded on a computer readable non-transitory storage medium, the computer executable program code comprising:

code for establishing a connection, by an apparatus, with a wireless device having a subset of service information available as default service information;

code for transmitting, by the apparatus, a request for additional service information available from the wireless device;

code for receiving, by the apparatus, from the wireless device, additional service information available from the wireless device, if the request is authorized by the wireless device; and code for receiving, by the apparatus, from the wireless device, a subset of service information available from the wireless device, if the request is not authorized by the wireless device.

An example embodiment of the invention includes a computer program product comprising computer executable program code recorded on a computer readable non-transitory storage medium, the computer executable program code comprising:

code for establishing a connection, by an apparatus, with a wireless device, the apparatus having a subset of service information available as default service information;

code for receiving, by the apparatus, from a wireless device, a request for service information available from the apparatus;

code for transmitting, by the apparatus, a wireless message to the wireless device, including additional service information available from the apparatus, if the request is received for the additional service information; and code for transmitting, by the apparatus, a wireless message to the wireless device, including a subset of service information available from the apparatus, if the request is not received for the additional service information.

DESCRIPTION OF THE FIGURES

FIG. 4B is an illustration of an example format for the Bluetooth Low Energy Advertising and scan response data, in accordance with at least one embodiment of the present invention.

FIG. 5A is an illustration of an example flow diagram of an example process in the mobile wireless device, carrying out the example operations, in accordance with at least one embodiment of the present invention.

FIG. 5B is an illustration of an example flow diagram of an example process in the wireless server device, carrying out the example operations, in accordance with at least one embodiment of the present invention.

FIG. 6 is a first example signal sequence diagram, in accordance with at least one embodiment of the present invention.

FIG. 7 is a second example signal sequence diagram, in accordance with at least one embodiment of the present invention.

FIG. 8 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

DISCUSSION OF EXAMPLE EMBODIMENTS OF THE INVENTION

Figure 1A:
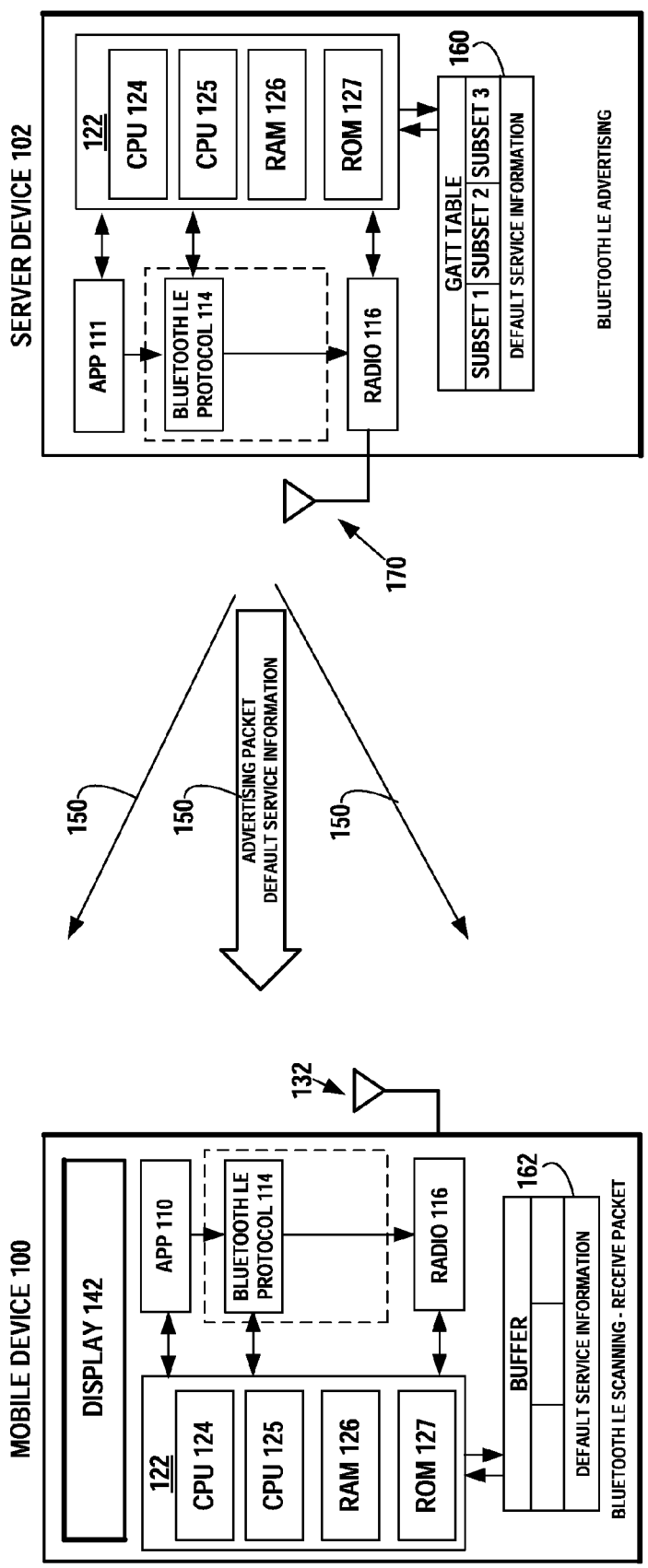
FIG. 1A is an illustration of an example embodiment of a network with an example mobile wireless device and a wireless server device. The mobile wireless device is shown scanning for Bluetooth™ Low Energy protocol (BLE) advertising messages. The wireless server device is shown transmitting BLE advertising messages including default service information, which inform the scanner of the presence and general character of the advertising device. The wireless server stores a GATT table that contains several subsets of information on the services that the wireless server device has available. The wireless server device is programmed to provide additional service information or the full set of GATT information to a requester, if an authorized request or connection for the full set is received. The wireless server device is further programmed to provide a subset of the full set of GATT information to a requester, if no authorized request or connection for the full set is received, in accordance with at least one embodiment of the present invention.

This section is organized into the following topics:
A. Wireless Short-Range Communication Networks
B. Bluetooth™ Low Energy (BLE) Technology
C. Touch-to-Select in Bluetooth Technology
D. Short Service Discovery
A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (BLE), IEEE 802.11 wireless local area network (WLAN), IEEE 802.15.4, and near field communication technologies, such as radio frequency identification (RFID) and near field communication (NFC) technology that enable contactless identification and interconnection of wireless devices. Bluetooth Technology provides an example of wireless short-range communication establishment.

B. Bluetooth™ Low Energy (BLE) Technology

The Bluetooth™ Core Specification, Version 4.2 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, separated by 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 10 octets to a maximum of 47 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.2, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

In the Bluetooth™ Core Specification, Version 4.2, the scanner device, also referred to as the initiator device, receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the scanner/initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.2, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth™ Specification Version 4.2, Bluetooth LE device discovery involves different operational processes for devices with different roles. In particular:

Slave Device, being an advertiser, performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Master Device, being an initiator/scanner, performs the initiating/scanning process. An initiating/scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator/scanner successfully discovers the advertising device. For the initiator, it can directly send back a "CONNECT_REQ" to establish a connection with that advertiser. For a scanner, it can send out a "SCAN_REQ" to ask for more information from that advertiser.

The CONNECT_REQ PDU has a payload field that consists of InitA, AdvA and LLData fields. The InitA field contains the Initiator's public or random device address, as indicated by a transmit address flag. The AdvA field contains the advertiser's public or random device address, as indicated by a receive address flag. The LLData consists of 10 fields, such as the Link Layer connection's Access Address, a channel map, a hop count increment, and other parameters needed to set up the connection.

The SCAN_REQ PDU has a payload field that consists of ScanA and AdvA fields. The ScanA field contains the scanner's public or random device address, as indicated by a transmit address flag. The AdvA field is the address of the device to which this PDU is addressed and contains the advertiser's public or random device address, as indicated by a receive address flag.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

1. Bluetooth™ LE Discovery:

At the start of each advertising event, the advertiser sends an advertising packet corresponding to the advertising event type. Depending on the type of advertising packet, the scanner may make a request to the advertiser on the same advertising PHY channel, which may be followed by a response from the advertiser on the same advertising PHY channel. The advertising PHY channel changes on the next advertising packet sent by the advertiser in the same advertising event. The advertiser may end the advertising event at any time during the event. The first advertising PHY channel is used at the start of the next advertising event.

Initiator devices that are trying to form a connection to another device listen for connectable advertising packets. If the advertiser is using a connectable advertising event, an initiator may make a connection request using the same advertising PHY channel on which it received the connectable advertising packet. The advertising event is ended and connection events begin if the advertiser receives and accepts the request for a connection be initiated. Once a connection is established, the initiator becomes the master device in a piconet and the advertising device becomes the slave device. Connection events are used to send data packets between the master and slave devices.

Devices are identified using a device address. Device addresses may be either a public device address or a random device address. A public device address and a random device address are both 48 bits in length. A device shall contain at least one type of device address and may contain both.

The public device address shall be created in accordance with section 9.2 ("48-bit universal LAN MAC addresses") of the IEEE 802-2001 standard (http://standards. ieee.org/get-ieee802/download/802-2001.pdf) and using a valid Organizationally Unique Identifier (OUI) obtained from the IEEE Registration Authority (http://standardsleee.org/regauth/oui/forms/ and sections 9 and 9.1 of the IEEE 802-2001 specification).

The public device address is divided into the following two fields:
  company_assigned field is contained in the 24 least significant bits
  company_id field is contained in the 24 most significant bits.

For the purposes of this profile, the random device address may be of either of the following two sub-types:
  Static address
  Private address The private address may be of either of the following two sub-types:
  Non-resolvable private address
  Resolvable private address Static and non-resolvable private address both contains address that is random. The main difference is that the device shall not change its static address value once initialized until the device is power cycled.

The random resolvable private device address is divided into the following two fields which can be used to identify the device:
  hash field is contained in the 24 least significant bits, as defined in Bluetooth™ Core Specification, Version 4.2 [Vol. 3] Part C, Section 10.8.2.3.
  random field is contained in the 24 most significant bits, as defined in Bluetooth™ Core Specification, Version 4.2 [Vol. 3] Part C, Section 10.8.2.2.

2. Bluetooth™ LE Link Layer Security a. Authorization

In a Bluetooth LE (BLE) connection authorization, a user of a Bluetooth device may grant a specific (remote) Bluetooth device access to a specific service. Authorization implies that the identity of the remote device can be verified through authentication. It is the act of granting a specific Bluetooth device access to a specific service. It may be based upon user confirmation, or given the existence of a trusted relationship. A service may require authorization before allowing access. Authorization is a confirmation by the user to continue with the procedure. Authentication does not necessarily provide authorization. Authorization may be granted by user confirmation after successful authentication. Authentication and authorization may be defined by a higher layer specification or be implementation specific.

b. Authentication and Encryption

Authentication is a generic procedure based on LMP-authentication if a link key exists or on LMP-pairing if no link key exists. LMP-authentication is an LMP level procedure for verifying the identity of a remote device. The procedure is based on a challenge-response mechanism using a random number, a secret key and the BD_ADDR of the non-initiating device. The secret key used can be a previously exchanged link key.

The Link Layer provides encryption and authentication using Counter with Cipher Block Chaining-Message Authentication Code (CCM) Mode, which shall be implemented consistent with the algorithm as defined in IETF RFC 3610 in conjunction with the AES-128 block cipher as defined in NIST Publication FIPS-197. The Link Layer connection may be either encrypted and authenticated or unencrypted and unauthenticated. In an encrypted and authenticated connection, all the Data Channel PDUs with a non-zero length Payload shall be encrypted and authenticated. Authentication is performed by appending a Message Integrity Check (MIC) field to the Payload.

c. Pairing and Bonding

LMP-pairing is a procedure that authenticates two devices, based on a PIN, and subsequently creates a common link key that can be used as a basis for a trusted relationship or a (single) secure connection. The procedure consists of the steps: creation of an initialization key (based on a random number and a PIN), creation and exchange of a common link key and LMP-authentication based on the common link key.

Bonding is a dedicated procedure for performing the first authentication, where a common link key is created and stored for future use. Trusting is the marking of a paired device as trusted. Trust marking can be done by the user, or automatically by the device (e.g. when in bondable mode) after a successful pairing.

Pairing and key distribution over a BLE physical link is defined by the Security Manager specification (Bluetooth™

Core Specification, Version 4.2 [Vol. 3], Part H Section 2.3). The pairing process may be initiated if either slave or master device request pairing to enable link encryption and possible authentication.

The purpose of bonding is to create a relation between two Bluetooth devices based on a stored security and identity information. A transport specific key distribution is performed during pairing process to share the keys which can be used to encrypt a link in future reconnections, verify signed data and random address resolution.

LE security uses the following keys and values for encryption, signing, and random addressing:

1. Identity Resolving Key (IRK) is a 128-bit key used to generate and resolve random addresses.
2. Connection Signature Resolving Key (CSRK) is a 128-bit key used to sign data and verify signatures on the receiving device.
3. Long Term Key (LTK) is a 128-bit key used to generate the contributory session key for an encrypted connection. Link Layer encryption is described in Bluetooth™ Core Specification, Version 4.2 [Vol 6] Part B, Section 5.1.3.
4. Encrypted Diversifier (EDIV) is a 16-bit stored value used to identify the LTK. A new EDIV is generated each time a unique LTK is distributed.
5. Random Number (Rand) is a 64-bit stored valued used to identify the LTK. A new Rand is generated each time a unique LTK is distributed.

In order for devices using the privacy feature to reconnect to known devices, the device addresses used when the privacy feature is enabled, private address, must be resolvable to the other devices' identity. The private address is generated using the device's identity key exchanged during the bonding procedure.

The Identity Resolving Key (IRK) is used for resolvable private address construction (see [Part C], Generic Access Profile, Section 10.8.2. A master that has received IRK from a slave can resolve that slave's random resolvable private device addresses. A slave that has received IRK from a master can resolve that master's random resolvable private device addresses. The privacy concept only protects against devices that are not part of the set to which the IRK has been given.

While a device is in the Peripheral or the Central role the device may support the Bonding procedure. While a device is in the Broadcaster or the Observer role the device shall not support the bonding procedure. The Host of the Central initiates the pairing process as defined in Bluetooth™ Core Specification, Version 4.2 [Vol. 3], Part C Section 2.1 with the Bonding_Flags set to Bonding as defined in [Vol. 3], Part H Section 3.5.1. If the peer device is in the bondable mode, the devices shall exchange and store the bonding information in the security database.

If a device has privacy enabled (as defined in Bluetooth™ Core Specification, Version 4.2, Table 10.7), the Host should send it's IRK to the peer device and request the IRK of the peer device during the pairing procedure. The Host can abort the pairing procedure if the authentication requirements are not sufficient to distribute the IRK. If the pairing procedure fails due to authentication requirements and IRK distribution was requested, the pairing procedure should be retried without requesting IRK distribution.

3. Bluetooth LE Timing in the Advertising, Scanning, and Initiator States:

a. Bluetooth LE Advertising State:

For all undirected advertising events or connectable directed advertising events used in a low duty cycle mode, the time between the start of two consecutive advertising events (T_advEvent) is computed as follows for each advertising event:

$$T\_advEvent = advInterval + advDelay$$

The advInterval shall be an integer multiple of 0.625 ms in the range of 20 ms to 10.24 s. If the advertising event type is either a scannable undirected event type or a non-connectable undirected event type, the advInterval shall not be less than 100 ms. If the advertising event type is a connectable undirected event type or connectable directed event type used in a low duty cycle mode, the advInterval can be 20 ms or greater. The advDelay is a pseudo-random value with a range of 0 ms to 10 ms generated by the Link Layer for each advertising event. Bluetooth™ Core Specification, Version 4.2, FIG. 4.1 shows an example timing diagram of advertising events perturbed in time using advDelay.

b. Bluetooth LE Scanning State:

If the advertiser receives a SCAN_REQ PDU that contains its device address from a scanner allowed by the advertising filter policy, it shall reply with a SCAN_RSP PDU on the same advertising channel index. After the SCAN_RSP PDU is sent, or if the advertising filter policy prohibited processing the SCAN_REQ PDU, the advertiser shall either move to the next used advertising channel index to send another ADV_IND PDU, or close the advertising event. Bluetooth™ Core Specification, Version 4.2, FIG. 4.3 shows an example timing diagram of a connectable undirected advertising event with SCAN_REQ and SCAN RESP PDUs in the middle of an advertising event.

c. Bluetooth LE Connection Setup in the Initiator State:

If the advertiser receives a CONNECT_REQ PDU that contains its device address, from an initiator allowed by the advertising filter policy, the Link Layer shall exit the Advertising State and transition to the Connection State in the Slave Role. If the advertising filter policy prohibited processing the received CONNECT_REQ PDU, the advertiser shall either move to the next used advertising channel index to send another ADV_IND PDU, or close the advertising event. Bluetooth™ Core Specification, Version 4.2, FIG. 4.13 shows a Master's view on link level connection setup with a non-zero transmitWindowOffset. Bluetooth™ Core Specification, Version 4.2, FIG. 4.14 shows a Master's view on link level connection setup with transmitWindowOffset set to zero.

4. Bluetooth Generic Attribute Profile (GATT)

Generic Attribute Profile (GATT) is built on top of the Attribute Protocol (ATT) and establishes common operations and a framework for the data transported and stored by the Attribute Protocol. GATT defines two roles: Server and Client. The GATT roles are not necessarily tied to specific Generic Access Profile (GAP) roles, but may be specified by higher layer profiles. GATT and ATT are not transport specific and can be used in both BR/EDR and LE. However, GATT and ATT are mandatory to implement in LE since it is used for discovering services.

A service is a collection of data and associated behaviors to accomplish a particular function or feature of a device or portions of a device. Examples of services that may be specified in a GATT table residing on a GATT server include the following:

Alert Notification Service
Battery Service
Current Time Service
Device Information
Immediate Alert
Internet Protocol Support
Link Loss Location and Navigation
Phone Alert Status Service
Reference Time Update Service
Tx Power
User Data A service may reference other primary or secondary services and/or a set of characteristics that make up the service. There are two types of services: primary and secondary. A primary service is a service that provides the primary functionality of a device. A secondary service is a service that provides auxiliary functionality of a device and is referenced from at least one primary service on the device.

A characteristic is a value used in a service along with properties and configuration information about how the value is accessed and information about how the value is displayed or represented. A characteristic definition contains a characteristic declaration, characteristic properties, and a value. It may also contain descriptors that describe the value or permit configuration of the server with respect to the characteristic value.

The GATT server stores the data transported over the Attribute Protocol and accepts Attribute Protocol requests, commands and confirmations from the GATT client. The GATT server sends responses to requests and when configured, sends indication and notifications asynchronously to the GATT client when specified events occur on the GATT server. GATT also specifies the format of data contained on the GATT server.

Attributes, as transported by the Attribute Protocol, are formatted as Services and Characteristics. Services may contain a collection of characteristics. Characteristics contain a single value and any number of descriptors describing the characteristic value.

With the defined structure of services, characteristics and characteristic descriptors a GATT client that is not specific to a profile can still traverse the GATT server and display characteristic values to the user. The characteristic descriptors can be used to display descriptions of the characteristic values that may make the value understandable by the user.

The GATT Profile specifies the structure in which profile data is exchanged. This structure defines basic elements such as services and characteristics, used in a profile. The top level of the hierarchy is a profile. A profile is composed of one or more services necessary to fulfill a use case. A service is composed of characteristics or references to other services. Each characteristic contains a value and may contain optional information about the value. The service and characteristic and the components of the characteristic (i.e., value and descriptors) contain the profile data and are all stored in Attributes on the server.

A referenced service is a method to incorporate another service definition on the server as part of the service referencing it. When a service references another service, the entire referenced service becomes part of the new service including any nested referenced services and characteristics. The referenced service still exists as an independent service. There are no limits to the depth of nested references.

GATT Service Discovery:

This procedure is used by a client to discover primary services on a server. Once the primary services are discovered, additional information about the primary services can be accessed using other procedures, including characteristic discovery and relationship discovery to find other related primary and secondary services. There are two sub-procedures that can be used for primary service discovery: Discover All Primary Services and Discover Primary Services by Service UUID.

Discover all Primary Services
This sub-procedure is used by a client to discover all the primary services on a server.

Discover Primary Service by Service UUID
This sub-procedure is used by a client to discover a specific primary service on a server when only the Service UUID is known. The specific primary service may exist multiple times on a server. The primary service being discovered is identified by the service UUID.

GATT Relationship Discovery
This procedure is used by a client to discover service relationships to other services. There is one sub-procedure that can be used for relationship discovery: Find Included Services.

GATT Characteristic Discovery:
This procedure is used by a client to discover service characteristics on a server. Once the characteristics are discovered additional information about the characteristics can be discovered or accessed using other procedures. There are two sub-procedures that can be used for characteristic discovery: Discover All Characteristics of a Service and Discover Characteristics by UUID.

Discover all Characteristics of a Service
This sub-procedure is used by a client to find all the characteristic declarations within a service definition on a server when only the service handle range is known. The service specified is identified by the service handle range.

Discover Characteristics by UUID
This sub-procedure is used by a client to discover service characteristics on a server when only the service handle ranges are known and the characteristic UUID is known. The specific service may exist multiple times on a server. The characteristic being discovered is identified by the characteristic UUID.

Bluetooth LE Device Discovery:
Devices that transmit advertising packets on the advertising PHY channels are referred to as advertisers. Devices that receive advertising on the advertising channels without the intention to connect to the advertising device are referred to as scanners. Transmissions on the advertising PHY channels occur in advertising events. At the start of each advertising event, the advertiser sends an advertising packet corresponding to the advertising event type. Depending on the type of advertising packet, the scanner may make a request to the advertiser on the same advertising PHY channel which may be followed by a response from the advertiser on the same advertising PHY channel. The advertising PHY channel changes on the next advertising packet sent by the advertiser in the same advertising event. The advertiser may end the advertising event at any time during the event. The first advertising PHY channel is used at the start of the next advertising event.

Devices that are trying to form a connection to another device listen for connectable advertising packets. Such devices are referred to as initiators. If the advertiser is using a connectable advertising event, an initiator may make a connection request using the same advertising PHY channel on which it received the connectable advertising packet. The advertising event is ended and connection events begin if the advertiser receives and accepts the request for a connection be initiated. Once a connection is established, the initiator becomes the master device in what is referred to as a piconet and the advertising device becomes the slave device. Connection events are used to send data packets between the master and slave devices.

In the advertising channel the advertising device sends advertising channel PDUs which has a 16-bit header and a variable size payload as shown in the figure below. The 16-bit header and ADV_IND (used as an example packet type in this invention) are also shown below.

The format of Advertising data and Scan Response data is shown in FIG. 4B. The data consists of a significant part and a non-significant part. The significant part contains a sequence of AD structures. Each AD structure shall have a Length field of one octet, which contains the Length value, and a Data field of Length octets. The first octet of the Data field contains the AD type field. The content of the remaining Length—1 octet in the Data field depends on the value of the AD type field and is called the AD data. The non-significant part extends the Advertising and Scan Response data to 31 octets and shall contain all-zero octets.

C. Touch-to-Select in Bluetooth Technology

The Bluetooth Touch-to-select feature employs Received Signal Strength Indication (RSSI) information, which is used in determining that a device is within "touch range", i.e. proximate or in close proximity of the inquiring device, and when a threshold for that close proximity is met. This may provide an "intent to share" or "touch to connect" feature.

1. Bluetooth™ RSSI

The received signal strength indicator (RSSI) is a measurement of the power of received radio signal. Bluetooth receiver circuits may include an RSSI detector circuit to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. If the Bluetooth receiver circuit supports RSSI, the accuracy may be +/−6 dBm or better.

RSSI Monitoring of Bluetooth LE Packets

During Bluetooth discovery in Bluetooth LE, before a connection is created, the RSSI may be measured from advertising packets received in broadcasting channel 37, 38, or 39, when they are received by a scanning device, if enabled by the host.

When the controller receives an advertising packet, an HCI LE Advertising Report event is sent by the controller to the host application. The HCI LE Advertising Report event indicates that a Bluetooth device or multiple Bluetooth devices have been detected during an active scan or during a passive scan. The HCI LE Advertising Report event includes a parameter N that indicates the RSSI of the received packet, with N being one octet representing the magnitude of the RSSI, with a range in units of dBm of −127≤N≤+20. This event will be sent from the Controller to the Host as soon as an advertising packet from a remote device is received. The RSSI parameter is measured during the receipt of the advertising packet. This event contains RSSI and advertising packet data for the remote device, among other information.

RSSI Monitoring of Data Packets Received Over a Connection

After the discovery phase is completed, once a Bluetooth LE device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application for example through the host controller interface (HCI) Read RSSI command, for example once per second.

The Read RSSI Command will read the value of the received signal strength indication (RSSI) for data communication packets received over the connection to another Bluetooth LE controller. The RSSI value is referenced with respect to a Connection Handle that identifies the connection and is assigned when the connection is created. The Connection Handle is used by the Bluetooth controller to determine which set of buffers to use and the logical link over which the data is to be sent.

In Bluetooth LE, the meaning of the RSSI metric is an absolute receiver signal strength value in dBm to ±6 dBm accuracy. If the RSSI cannot be read, the RSSI metric is set to 127.

Measuring Pathloss with the RSSI and the TX Power Level

The TX Power Level data field in the Bluetooth LE advertising packet indicates the transmitted power level of the advertising packets at the transmitter of the sending device. The TX Power Level is reported to the host in response to the HCI LE Read Advertising Channel Tx Power Command. The TX Power Level data field may be used to calculate path loss of a received packet when the receiving device measures the RSSI of the received advertising packet, using the following equation:

$$\text{pathloss} = Tx \text{ Power Level} - RSSI \text{ of the inquiry response packet}$$

For example, if Tx Power Level=+4 (dBm) and the RSSI on the received packet is −60 (dBm) then the total pathloss is +4−(−60)=+64 dB. If a second packet were received at −40 dBm with a Tx Power Level data=+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be alleviated if multiple packets are received from the same device.

2. Bluetooth™ Host Controller Interface

The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core 4.0 Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands and Events

HCI LE Advertising Report Event

The Bluetooth LE device discovery group of commands and events allow a device to discover other devices in the surrounding area. The Bluetooth LE host controller interface includes the HCI LE Advertising Report event that indicates that a Bluetooth device or multiple Bluetooth devices have been detected during an active scan or during a passive scan.

The scanning device may ask further information of advertising device with scan request packet. Once advertiser has received scan request packet it may answer with scan response packet.

Connection Phase HCl Commands and Events

HCl LE Read Advertising Channel Tx Power Command

The TX Power Level is reported to the host in response to the HCl LE Read Advertising Channel Tx Power Command. The TX Power Level data field may be used to calculate path loss of a received packet when the receiving device measures the RSSI of the received advertising packet.

After the discovery phase is completed, once a Bluetooth device is connected to another Bluetooth device, the received signal strength indication (RSSI) may be used by a receiving device to monitor the received power level of the data communication packets received over the connection. The RSSI value is calculated by the Bluetooth physical layer, and may be read by the host application through the host controller interface (HCl) Read RSSI command.

The Read RSSI command will read the value of the received signal strength indication (RSSI) for data communication packets received over the connection to another Bluetooth controller. The RSSI value is referenced with respect to a Connection Handle that identifies the connection and is assigned when the connection is created. The Connection Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For Bluetooth LE transport, a Connection Handle is used as the Handle command parameter and return parameter. The meaning of the RSSI metric is an absolute receiver signal strength value in dBm to ±6 dBm accuracy.

3. Bluetooth LE Proximity Profile

The Proximity Profile defines the behavior when a device moves away from a peer device so that the connection is dropped or the path loss increases above a preset level, causing an immediate alert. This alert may be used to notify the user that the devices have become separated. As a consequence of this alert, a device may take further action, for example to lock one of the devices so that it is no longer usable.

The Proximity Profile may also be used to define the behavior when the two devices come closer together such that a connection is made or the path loss decreases below a preset level.

The Proximity Profile defines two profile roles to enable devices to detect their proximity: the Proximity Reporter and the Proximity Monitor. The Proximity Reporter is a Generic Attribute Profile (GATT) server on the one device in the connection, which supports a Link Loss Service (mandatory), an Immediate Alert Service (optional), and a transmit (Tx) Power Service (optional). The Proximity Monitor is a GATT client on the peer device in the connection, which monitors the Radio Signal Strength Information (RSSI) of the connection to calculate the signal's path loss. The Proximity Monitor may use the information received from the Proximity Reporter's Tx Power Service to normalize the RSSI value, by subtracting the RSSI from the Tx Power Level. In order to trigger an alert on low RSSI, the Proximity Monitor constantly monitors RSSI.

The Proximity Monitor on one device may maintain a connection with the Proximity Reporter on the peer device and monitor the RSSI of this connection. The Proximity Monitor may calculate the path loss by subtracting the RSSI from the transmit power level of the device of the Proximity Reporter, as discovered using the Reading Tx Power procedure. If the path loss exceeds a threshold set on the Proximity Monitor, it may write in the Alert Level characteristic of the Immediate Alert service, using the GATT Write Without Response sub-procedure, to cause the Proximity Reporter to generate an alert. The Proximity Monitor may also generate an alert when the path loss exceeds the threshold. The duration of the alert may be implementation specific.

The Proximity Monitor specified in the Bluetooth Proximity Profile, may include the following functions:

Service Discovery from the peer device;
Characteristic Discovery from the peer device;
Configuration of Alert on Link Loss to the peer device;
Alert on Link Loss to the peer device;
Reading Tx Power from the peer device; and
Alert on Path Loss locally and to the peer device based on RSSI supervision.

If the path loss falls below a threshold set on the Proximity Monitor it may write in the Alert Level characteristic of the Immediate Alert service, using the GATT Write Without Response sub-procedure, to cause the Proximity Reporter to end the alert. When the path loss is below the threshold the Proximity Monitor should stop alerting.

If link loss occurs during this procedure, then the behavior defined in the Alert on Link Loss procedure may be used.

D. Short Service Discovery

A problem in current mobile operating systems is that when a Bluetooth LE device connects to a another wireless device, such as a server device, it must perform a lengthy service discovery procedure requiring the downloading of the entire GATT table describing all of the services, relationships, and characteristics contained in the table. Thus, the connecting device may require several seconds to complete the service discovery, depending on the operating system and the size of the GATT table, when the more limited information of interest may have taken less than 100 milliseconds to download. This requirement presents a problem where a Bluetooth LE device tries to perform service discovery in a crowded environment, such as in a wireless vending area or in an access gate area for mass transit, where a large number of devices need to be serviced at the same time. If all of the devices were to try to connect to the wireless server at the same time, downloading the full GATT table during each service discovery operation may take as much as minutes to complete. Another problem, related to security, is that the GATT table is visible to all users who are connected, raising the risk that it is more easily reverse engineered to find out how the product works. There may be characteristics that require authentication, but the GATT table structure can be read by any connected device. The current Bluetooth LE implementation requires a static GATT table that must be read in its entirety during service discovery, by the connecting device.

In accordance with an example embodiment of the invention, a limited or small subset of the GATT table may be transmitted, by default, in response to general service discovery requests. If an authorized request for the full or advanced GATT table is received during service discovery, then the full GATT table may be transmitted to the requesting device. In example embodiments of the invention, Bluetooth LE (BLE) connection authorization may also provide authorization of to receive a full set of GATT information. This would enable enhanced functionality for the requesting device. There may be different subsets of the full GATT table that may be requested by different requesters, for example a mechanical engineer may receive a different subset, than that received by an electrical engineer.

FIG. 1A is an illustration of an example embodiment of a network with an example mobile wireless device 100 and a wireless server device 102. The mobile wireless device 100 is shown scanning for Bluetooth™ Low Energy protocol (BLE) advertising messages. The wireless server device 102 is shown broadcasting BLE advertising messages 150 over any of the 3 advertising PHY channels used by devices to advertise their existence and capabilities. The BLE advertising messages 150, which include default service information, inform the mobile wireless device 100 of the presence and general character of the advertising server device 102. The mobile wireless device 100 is shown receiving the BLE advertising messages 150.

The mobile wireless device 100 is trying to establish a connection to another device, it is an initiator device that listens for connectable advertising packets. If the wireless server device 102 is using a connectable advertising event, the mobile wireless device 100, as an initiator, may make a connection request using the same advertising PHY channel on which it received the connectable advertising packet. The advertising event is ended and connection events begin if the advertiser server device 102 receives and accepts the request for a connection be initiated. Once a connection is established, the initiator wireless device 100 becomes the master device in a piconet and the advertising server device 102 becomes the slave device. Connection events are used to send data packets between the mobile wireless device 100 and wireless server device 102 over any of the 37 data communication PHY channels.

The wireless server 102 stores a GATT table 160 that contains several subsets of information on the services that the wireless server device 102 has available. In accordance with an example embodiment of the invention, the wireless server device 102 is programmed to provide additional service information or the full set of GATT information to a requester device, if an authorized request or connection for additional service information or the full set is received. In accordance with an example embodiment of the invention, the wireless server device 102 is further programmed to provide a subset of the full set of GATT information to a requester device, if no authorized request or connection for additional service information or the full set is received.

In example embodiments of the invention, the wireless mobile device 100 and the wireless server device 102 may include a processor 122 that includes from one to many central processing units (CPUs) 124 and/or 125, a random access memory (RAM) 126, a read only memory (ROM) 127, and interface circuits to interface with one or more radio transceivers 116, antenna 132, 170, and battery or house power sources. The wireless mobile device 100 may include a keypad, display 142, etc. The RAM and ROM can be removable memory devices such as smart cards, SIMs, WIMs, semiconductor memories such as RAM, ROM, PROMS, flash memory devices, etc., as shown in FIG. 8. In an example embodiment of the invention, the RAM 126 or buffer 162 in the mobile wireless device 100 may store the default service information contained in received advertising messages 150, for example, a description of the capabilities of the sending device 102 in received advertising messages 150.

In an example embodiment of the invention, the Bluetooth mobile wireless device 100 and the wireless device 102 include the Bluetooth™ Low Energy protocol (BLE) 114.

In an example embodiment of the invention, the mobile wireless device 100 may be, for example, a miniature device such as a key fob, smart card, jewelry, or the like. In an example embodiment of the invention, the mobile wireless device 100 may be, for example, a relatively larger cell phone, smart phone, flip-phone, PDA, graphic pad. The mobile wireless device 100 may also be in an automobile or other vehicle. The wireless server device 102 may be, for example, a service-providing device that is either in a fixed position or mobile. In embodiments, the relative sizes of devices 100 and 102 may be arbitrary.

Figure 1B:
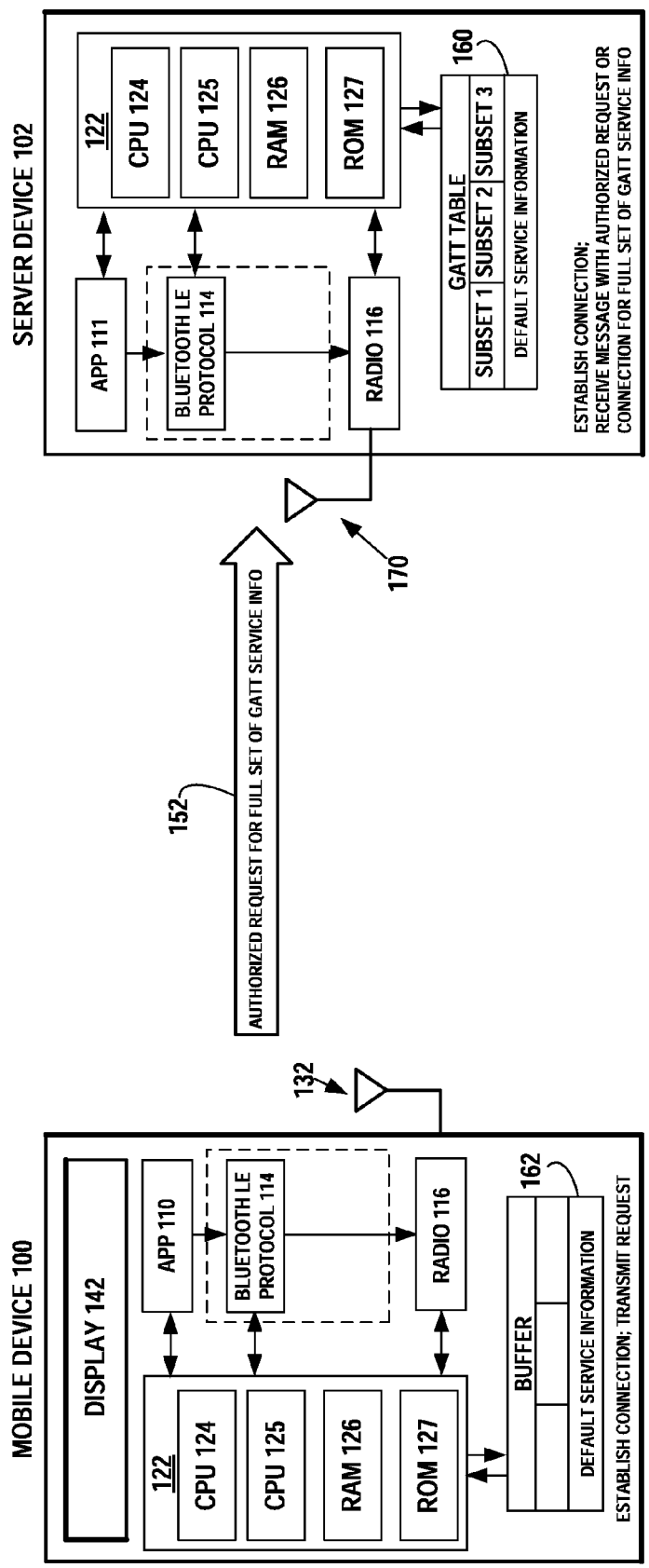
FIG. 1B is an illustration of an example embodiment of the network of FIG. 1A, wherein the mobile wireless device and the wireless server device have established a wireless connection. In accordance with an example embodiment of the invention, the mobile device transmits a wireless request message to the server device, with an authorized request or connection for additional service information or the full set of GATT service information, in accordance with at least one embodiment of the present invention.

FIG. 1B is an illustration of an example embodiment of the network of FIG. 1A, wherein the mobile wireless device 100 and the wireless server device 102 have established a wireless connection. In accordance with an example embodiment of the invention, the mobile device 100 performs service discovery by transmitting a wireless request message 152 to the server device 102, with an authorized request for additional service information or the full set of GATT service information, in accordance with at least one embodiment of the present invention. In example embodiments of the invention, BLE connection authorization may also provide authorization of to receive additional service information or a full set of GATT information. The wireless request message 152 may be one or more Bluetooth LE data packets sent from the mobile wireless device 100 to the wireless server device 102 over any of the 37 data communication PHY channels.

Examples of modes of authorization for the request for service information, may be based on security information entered by the user/or BLE connection authorization, such as a PIN, password, hash, or key, or on a device ID or key provided by the requesting device 100. The wireless device 100 may provide a hash value to the server device 102, with the hash calculated, for example, based on keys, user identifiers, and the like.

The authorized request may be indicated by at least one of device level authentication and application level authorization. Device level authentication may include the BD_ADDR Bluetooth device address, which is a unique combination of 12 alphanumeric characters integral with the transmitting device. Application level authorization may include a PIN or digital signature authorized by the user and managed by an application in the transmitting device.

Figure 1C:
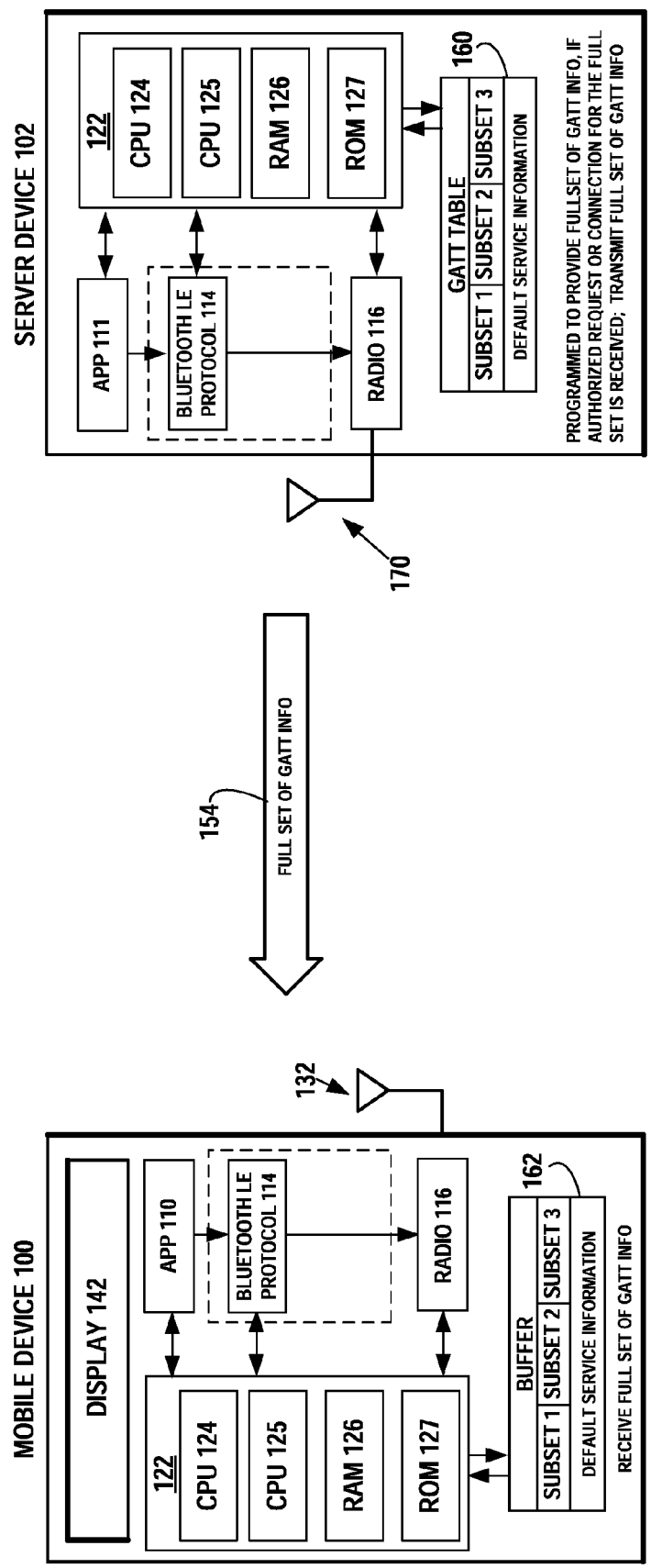
FIG. 1C is an illustration of an example embodiment of the network of FIG. 1A, wherein the wireless server device determines that it has received an authorized request or connection for additional service information or the full set of GATT service information. In response, the wireless server device transmits the additional service information or full set of GATT service information to the requesting wireless device, in accordance with at least one embodiment of the present invention.

FIG. 1C is an illustration of an example embodiment of the network of FIG. 1A, wherein the wireless server device 102 determines that it has received an authorized request or connection for additional service information or the full set of GATT service information. The determination may be a verification procedure applied by the server device 102 to the received PIN, password, hash, key, or device ID.

In an example embodiment of the invention, the wireless server device 102 is programmed to provide the additional service information or full set of GATT service information to a requester, if an authorized request or connection for the additional service information or full set is received. If the wireless device 100 attempts to access GATT data on the server 102 and if the wireless device 100 is not authorized for the access, then the server device 102 would detect this by a verification procedure applied by the server device 102 to the received PIN, password, hash, key, or device ID. As a result, the server device 102 would prevent the access. In accordance with an example embodiment, the server device 102 may respond by sending a default subset of the GATT service information, to the wireless device 100.

In response, if the request from the wireless device 100 is authorized, then the wireless server device 102 transmits a response message 154 with the additional service information or full set of GATT service information to the requesting wireless device 100, in accordance with at least one embodiment of the present invention. The wireless response message 154 may be one or more Bluetooth LE data packets sent from the wireless server device 102 to the wireless device 100 over any of the 37 data communication PHY channels. The full set of GATT service information, for example, is shown as Subset 1, Subset 2, and Subset 3. The wireless device 100 is shown receiving the full set of GATT service information, which it stores in the buffer 162.

Figure 2A:
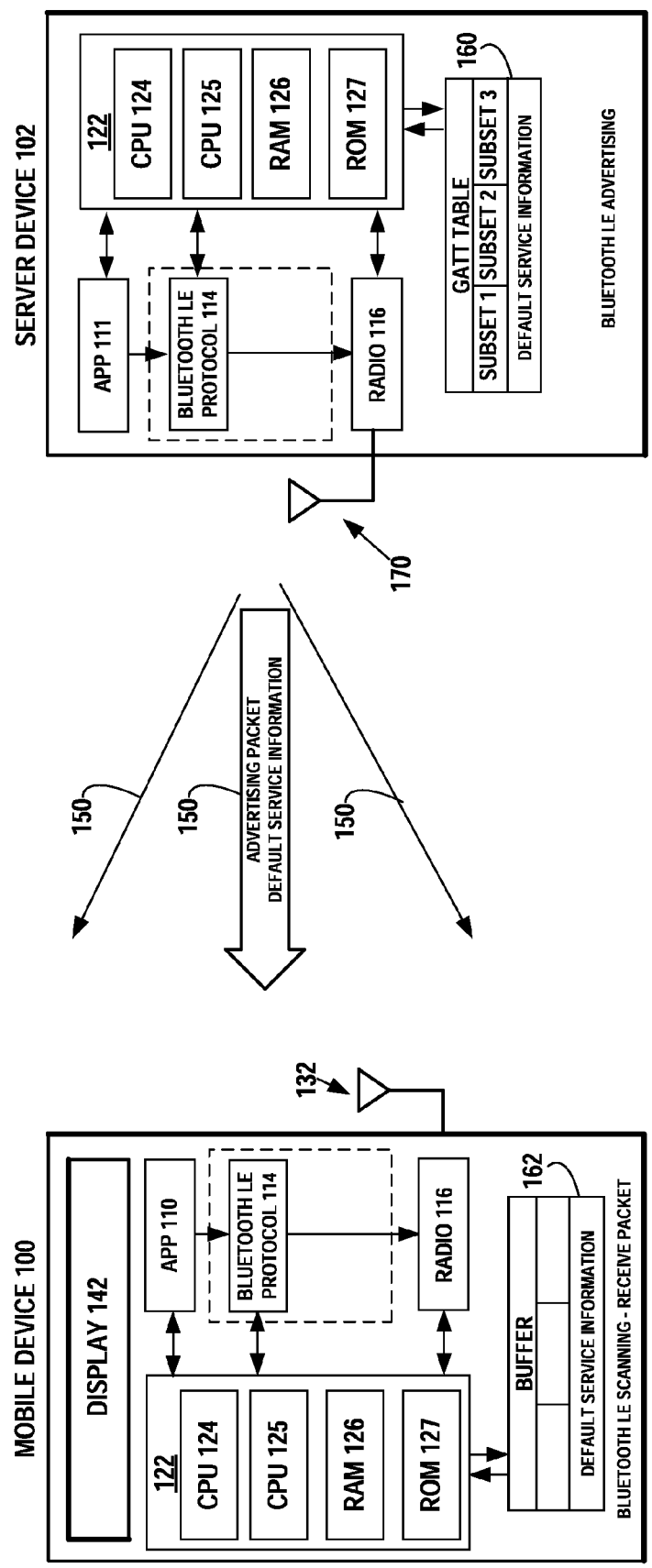
FIG. 2A is an illustration of an example embodiment of the network of FIG. 1A, wherein the mobile wireless device is shown scanning for Bluetooth™ Low Energy protocol (BLE) advertising messages and the wireless server device is shown transmitting BLE advertising messages, in accordance with at least one embodiment of the present invention.

FIG. 2A is an illustration of an example embodiment of the network of FIG. 1A, wherein the wireless server device 102 is shown transmitting BLE advertising messages 150 and the mobile wireless device 100 is shown scanning for Bluetooth™ Low Energy protocol (BLE) advertising messages 150, in accordance with at least one embodiment of the present invention.

Figure 2B:
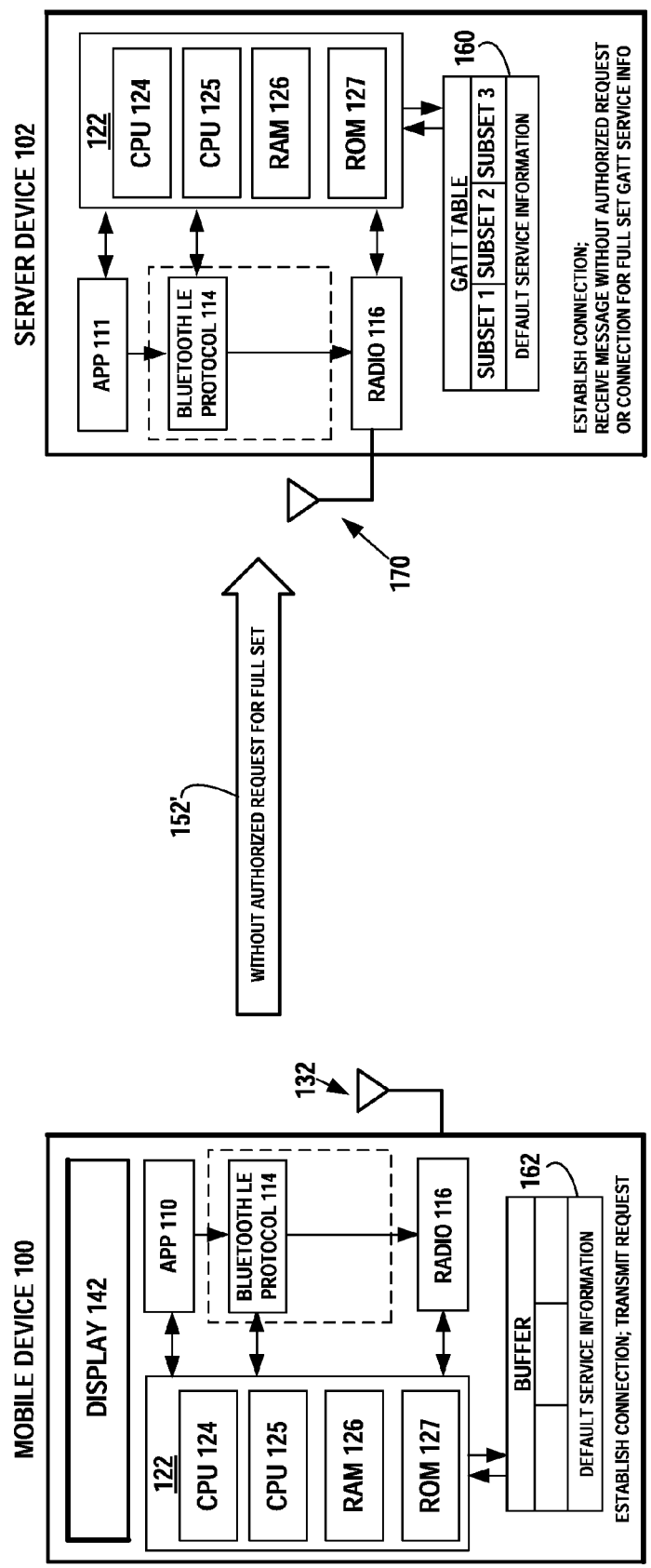
FIG. 2B is an illustration of an example embodiment of the network of FIG. 2A, wherein the mobile wireless device and the wireless server device have established a wireless connection. In accordance with an example embodiment of the invention, the mobile device transmits a wireless request message to the server device, but the message is not an authorized request or connection for the full set of GATT service information, in accordance with at least one embodiment of the present invention.

FIG. 2B is an illustration of an example embodiment of the network of FIG. 2A, wherein the mobile wireless device 100 and the wireless server device 102 have established a wireless connection. In accordance with an example embodiment of the invention, the mobile device 100 transmits a wireless request message 152' to the server device 102, but the message 152' is not an authorized request or connection for additional service information or the full set of GATT service information, in accordance with at least one embodiment of the present invention. The message 152' may not contain an authorized request or the BLE connection may not be authorized, for example because the verification procedure failed when applied to the received PIN, password, key, or device ID. Alternately, the message 152' may not contain an authorized request, for example because there was no request for additional service information or a full set of GATT service information. The wireless request message 152' may be one or more Bluetooth LE data packets sent from the mobile wireless device 100 to the wireless server device 102 over any of the 37 data communication PHY channels.

Figure 2C:
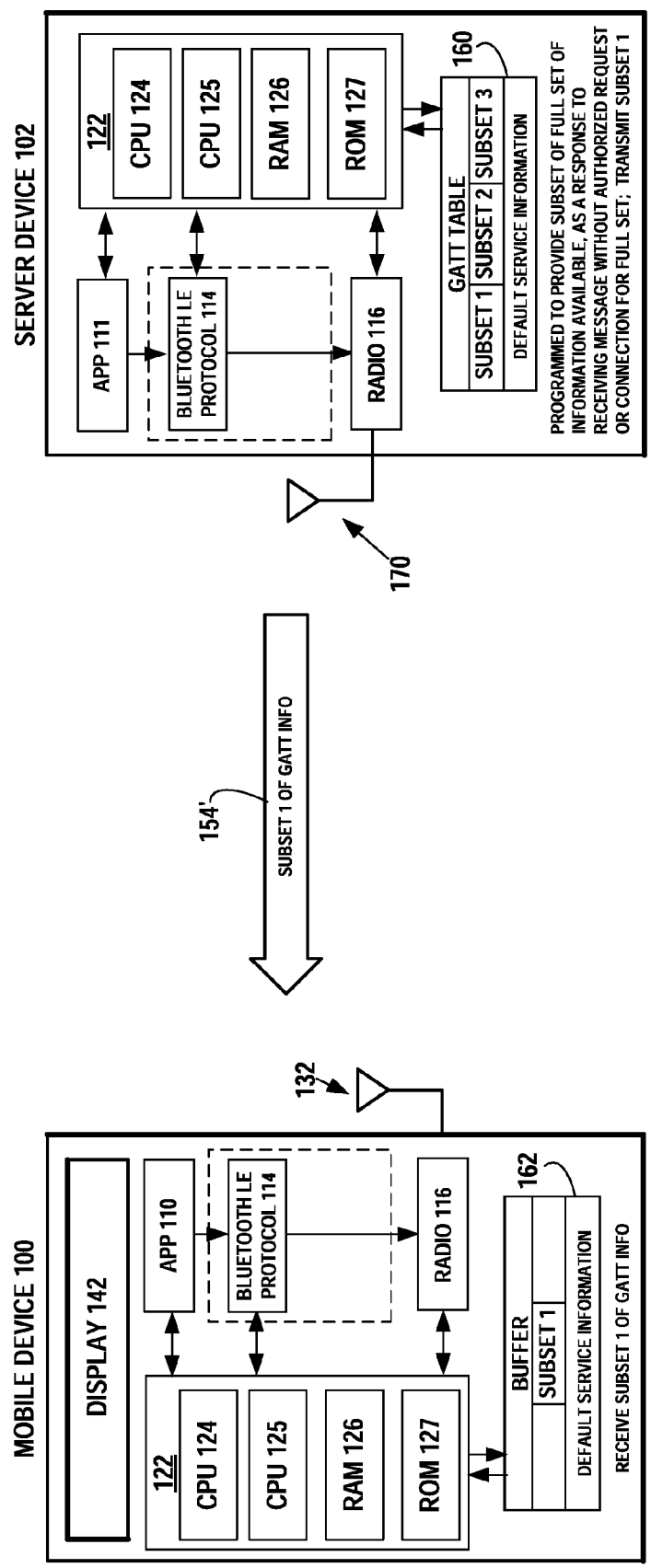
FIG. 2C is an illustration of an example embodiment of the network of FIG. 2B, wherein the wireless server device determines that it has not received an authorized request or connection for the full set of GATT service information. In response, the wireless server device transmits a default subset of the full set of GATT service information to the requesting wireless device, in accordance with at least one embodiment of the present invention.

FIG. 2C is an illustration of an example embodiment of the network of FIG. 2B, wherein the wireless server device 102 determines that it has not received an authorized request/or BLE connection is not authorized for the additional service information or full set of GATT service information. In an example embodiment of the invention, the wireless server device 102 is programmed to provide a default subset of the full set of GATT service information to a requester, if an unauthorized request for the full set is received.

In response, the wireless server device 102 transmits a response message 154', with a default subset of the full set of GATT service information, to the requesting wireless device 100, in accordance with at least one embodiment of the present invention. The wireless response message 154' may be one or more Bluetooth LE data packets sent from the wireless server device 102 to the wireless device 100 over any of the 37 data communication PHY channels. The subset of the full set of GATT service information, for example, is shown as Subset 1. The wireless device 100 is shown receiving the subset of the full set of GATT service information, which it stores in the buffer 162. An example subset may be just the names of the services available, without being accompanied by details of their properties or values.

The example embodiment of the invention provides an improvement to GATT based service discovery, by enabling a servicing node to provide only a small subset of service through GATT tables to a "normal" scanning device, while providing an advanced/full GATT table only to an authorized scanning device triggering advanced/full GATT table delivery.

Figure 3A:
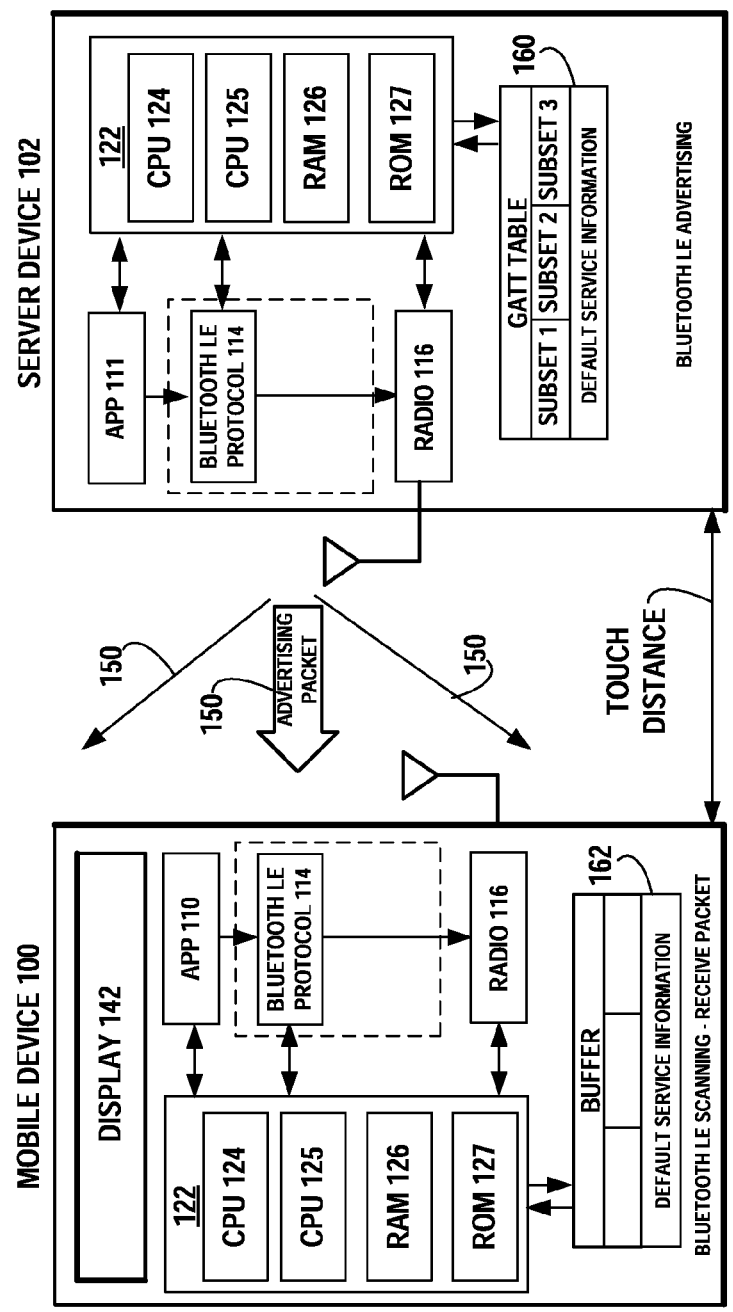
FIG. 3A is an illustration of an example embodiment of the network of FIG. 1A, wherein the mobile wireless device has moved closer to the server device to a position that is within a touch distance from a location of the wireless server device.

FIG. 3A is an illustration of an example embodiment of the network of FIG. 1A, wherein the mobile wireless device 100 is shown scanning for Bluetooth™ Low Energy protocol (BLE) advertising messages 150 and the wireless server device 102 is shown transmitting BLE advertising messages 150. The mobile wireless device 100 has moved closer to the server device 102 to a position that is within a touch distance from a location of the wireless server device.

Figure 3B:
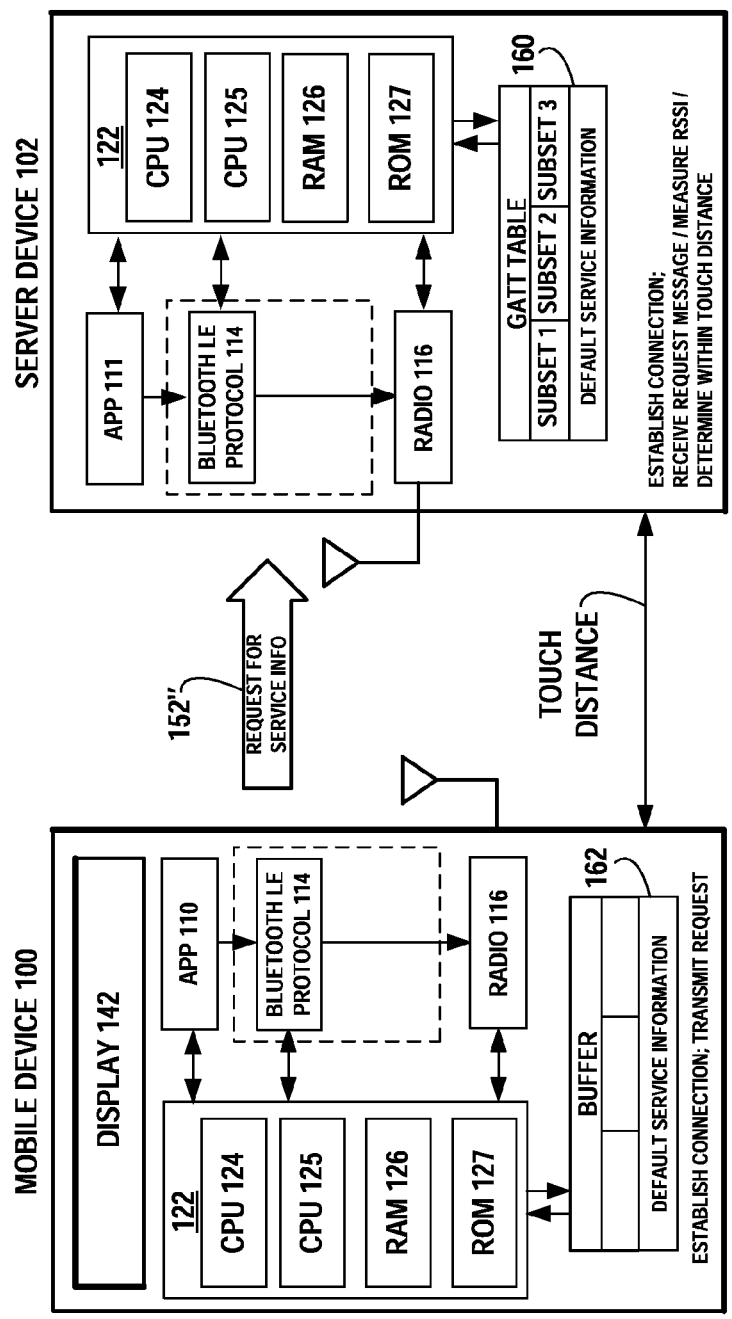
FIG. 3B is an illustration of an example embodiment of the network of FIG. 3A, wherein the mobile wireless device and the wireless server device have established a wireless connection. In accordance with an example embodiment of the invention, the mobile device performs service discovery by transmitting a wireless request message to the server device. In an example embodiment of the invention, the wireless service device determines proximity to the wireless mobile device by measuring the RSSI signal strength of the one or more received wireless request messages.

FIG. 3B is an illustration of an example embodiment of the network of FIG. 3A, wherein the mobile wireless device 100 and the wireless server device 102 have established a wireless connection. In accordance with an example embodiment of the invention, the mobile device 100 performs service discovery by transmitting a wireless request message 152" to the server device 102. The wireless request message 152" may be one or more Bluetooth LE data packets sent from the mobile wireless device 100 to the wireless server device 102 over any of the 37 data communication PHY channels.

In an example embodiment of the invention, the wireless service device 102 determines proximity to the wireless mobile device 100 by measuring the RSSI signal strength of the one or more received wireless request messages 152". The wireless server device 102 determines it is within a touch distance to the mobile wireless device 100, based on the measured RSSI signal strength of the one or more received BLE wireless request messages 152".

Figure 3C:
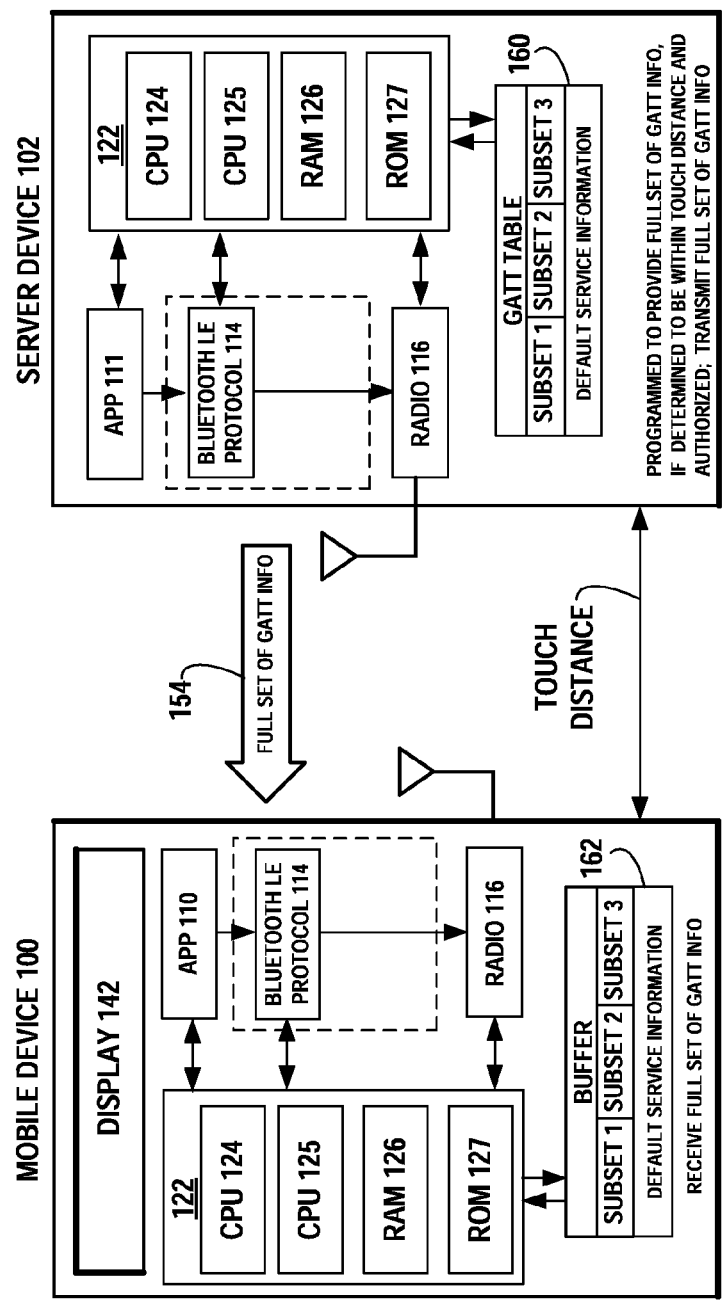
FIG. 3C is an illustration of an example embodiment of the network of FIG. 3B, wherein the wireless server device determines that it is within a touch distance to the mobile wireless device, based on the measured RSSI signal strength of the one or more received wireless request messages. The mobile wireless device triggers the indication to the wireless server device of an authorization for the full set of GATT service information, in response to the mobile wireless device having moved to the position within the touch distance.

FIG. 3C is an illustration of an example embodiment of the network of FIG. 3B, wherein the wireless server device 102 determines that it is within a touch distance to the mobile wireless device 100, based on the measured RSSI signal strength of the one or more received BLE wireless request messages 152".

In an example embodiment of the invention, the wireless server device is programmed to provide the additional service information or full set of service information to a requester, for the combined conditions of: [1] that some indication has been provided to the wireless server device 102, that the wireless device 100 is authorized to request the additional service information or full set of service information, and [2] that the wireless server device 102 and the wireless device 100 are within a touch distance from each other. When both of these conditions are true, then this triggers an authorization to the wireless server device 102, for the additional service information or full set of service information, in response to the two devices moving to within the touch distance. Examples of modes of authorization for the request for service information, may be based on security information entered by the user, such as a PIN, password, hash, or key, or on a device ID or key provided by the requesting device 100. In example embodiments of the invention, BLE connection authorization may also provide authorization of to receive additional service information or a full set of GATT information.

The mobile wireless device 100 triggers the indication to the wireless server device 102 of a request for additional service information or the full set of GATT service information, in response to the mobile wireless device 100 having moved to the position within the touch distance.

In response, the wireless server device 102 transmits a response message 154 with the additional service information or full set of GATT service information to the requesting wireless device 100, in accordance with at least one embodiment of the present invention. The wireless response message 154 may be one or more Bluetooth LE data packets sent from the wireless server device 102 to the wireless device 100 over any of the 37 data communication PHY channels. The full set of GATT service information, for example, is shown as Subset 1, Subset 2, and Subset 3. The wireless device 100 is shown receiving the full set of GATT service information, which it stores in the buffer 162.

Figure 4:
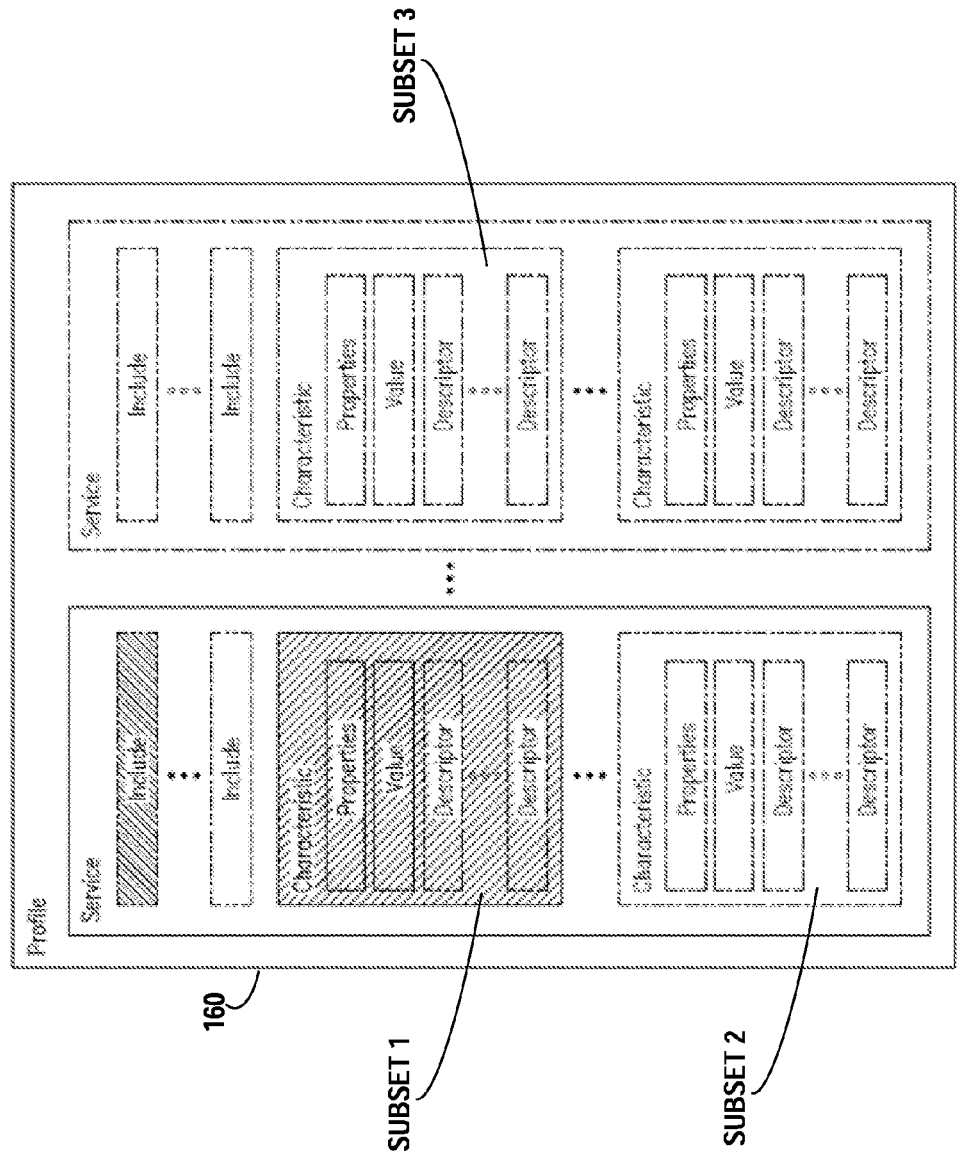
FIG. 4 is an illustration of an example format for the GATT service information table in the wireless server device, in accordance with at least one embodiment of the present invention.

FIG. 4 is an illustration of an example format for the GATT service information table 160 in the wireless server device 102, in accordance with at least one embodiment of the present invention. The GATT service information table structure defines basic elements such as services and characteristics, used in a profile. The top level of the hierarchy is a profile. A profile is composed of one or more services necessary to fulfill a use case. A service is composed of characteristics or references to other services. Each characteristic contains a value and may contain optional information about the value. The service and characteristic and the components of the characteristic (i.e., value and descriptors) contain the profile data and are all stored in Attributes on the server device 102. The figure shows example subset 1, subset 2, and subset 3 in the GATT service information table 160.

Figure 4A:
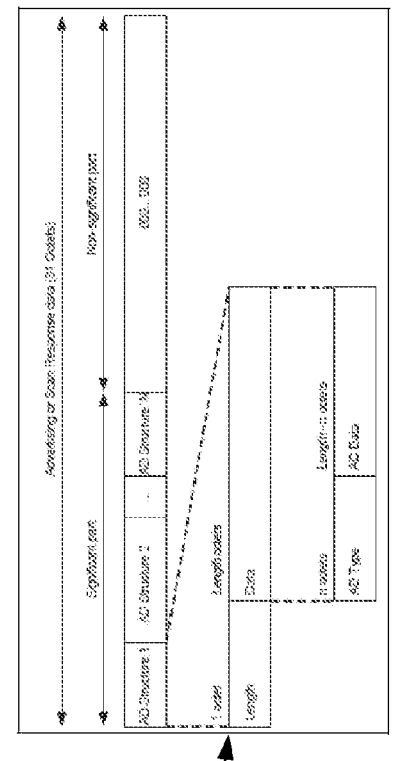
FIG. 4A is an illustration of an example format for the Bluetooth Low Energy Advertising channel PDU, Advertising channel PDU header, and ADV_IND payload, in accordance with at least one embodiment of the present invention.
Figure 4A:
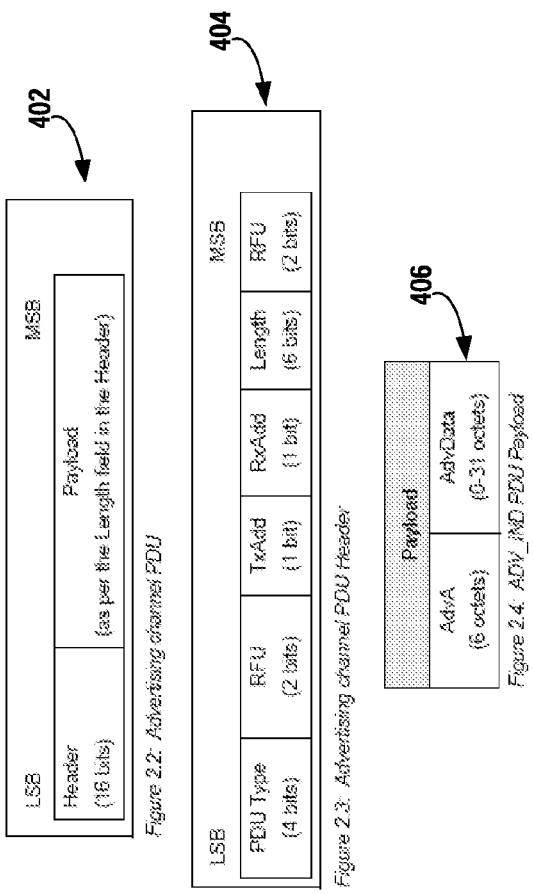

FIG. 4A is an illustration of an example format for the Bluetooth Low Energy Advertising channel PDU 402, Advertising channel PDU header, 404, and ADV_IND payload 406, in accordance with at least one embodiment of the present invention. The ADV_IND payload 406 has a payload field that may contain AdvA and AdvData fields. The AdvA field contains the advertiser's public or random device address and the AdvData field may contain Advertising data from the advertiser's host.

FIG. 4B is an illustration of an example format for the Bluetooth Low Energy Advertising and Scan Response data, in accordance with at least one embodiment of the present invention. The format of Advertising data and Scan Response data consists of a significant part and a non-significant part. The significant part contains a sequence of AD structures. Each AD structure shall have a Length field of one octet, which contains the Length value, and a Data field of Length octets. The first octet of the Data field contains the AD type field. The content of the remaining Length—1 octet in the Data field depends on the value of the AD type field and is called the AD data. The non-significant part extends the Advertising and Scan Response data to 31 octets and shall contain all-zero octets.

FIG. 5A is an illustration of an example flow diagram 500 of an example process in the mobile wireless device 100, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 502: establishing a connection, by an apparatus, with a wireless device having a subset of service information available as default service information;

Step 504: transmitting, by the apparatus, a request for additional service information available from the wireless device;

Step 506: receiving, by the apparatus, from the wireless device, additional service information available from the wireless device, if the request is authorized by the wireless device; and Step 508: receiving, by the apparatus, from the wireless device, a subset of service information available from the wireless device, if the request is not authorized by the wireless device.

FIG. 5B is an illustration of an example flow diagram 550 of an example process in the wireless server device 102, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 552: establishing a connection, by an apparatus, with a wireless device, the apparatus having a subset of service information available as default service information;

Step 554: receiving, by the apparatus, from a wireless device, a request for service information available from the apparatus;

Step 556: transmitting, by the apparatus, a wireless message to the wireless device, including additional service information available from the apparatus, if the request is received for the additional service information; and Step 558: transmitting, by the apparatus, a wireless message to the wireless device, including a subset of service information available from the apparatus, if the request is not received for the additional service information.

FIG. 6 is a first example signal sequence diagram, in accordance with at least one embodiment of the present invention. In the first example, the connection is disconnected and the apparatus starts advertising with a new address and may for example white list the device. When the device connects to apparatus it may consider the apparatus as a new device and does the service discovery and security (which may use for example different keys for security).

Step 602: receiving, by the wireless device 100, wireless device discovery advertising messages from a wireless server device 102, the wireless server device being programmed to provide a subset of a full set of service information available from the wireless server device, as a default response to requests for service information;

Step 604: creating, by the wireless device 100, a wireless communications connection with the wireless server device, in response to receiving the wireless device discovery messages;

Step 606: indicating, by the wireless device 100, to the wireless server device, an enhanced functionality, by sending a request for the full set of service information available from the wireless server device. The request may be accompanied by credentials authorizing the request by wireless device 100 for service information, such as a PIN, password, hash, or key, or a device ID or key provided by the requesting device 100. The server device 102 may apply validation procedures to determine if the request is authorized. The server device 102 will store the authorization result for the wireless device 100 in a white list for later use in step 612 or connection could be authorized.

Step 608: disconnecting, by the wireless device 100, the wireless communications connection with the wireless server device;

Step 610: receiving, by the wireless device 100, second wireless device discovery advertising messages from the wireless server device, which include a new address for the wireless server device;

Step 612: creating, by the wireless device 100, a second wireless communications connection with the wireless server device, in response to receiving the second wireless device discovery messages. The server device 102 will be able to verify the authorization for the wireless device 100, based on the white list entry made in step 606.

Step 614: receiving, by the wireless device 100, from the wireless server device, the full set of service information available from the wireless server device, in response to the indicating.

Step 616: reading, by the wireless device 100, the GATT service information.

FIG. 7 is a second example signal sequence diagram, in accordance with at least one embodiment of the present invention. In the second example, the apparatus just informs the device that the services have been changed and the device should re-read the updated GATT table.

Step 702: receiving, by the wireless device 100, wireless device discovery advertising messages from a wireless server device 102, the wireless server device being programmed to provide a subset of a full set of service information available from the wireless server device, as a default response to requests for service information;

Step 704: creating, by the wireless device 100, a wireless communications connection with the wireless server device, in response to receiving the wireless device discovery messages;

Step 706: indicating, by the wireless device 100, to the wireless server device, an enhanced functionality, by sending a request for the full set of service information available from the wireless server device;

Step 708: receiving, by the wireless device 100, from the wireless server device, an indication of updated GATT table of service information available from the wireless server device, in response to the indicating.

Step 710: reading, by the wireless device 100, the full set of GATT service information.

In the first and the second examples of FIGS. 6 and 7, the apparatus advertises it presence and the device creates a connection. Then the device requests enhanced functionality. The enhanced functionality may be requested by writing predetermined value to characteristics. This value can be, for example, received from the remote server or it can be part of the application program. Other methods may be, for example, touching the apparatus with the device which leads to high RSSI, which can enable to enhanced functionality. The apparatus may verify if the access to more of the GATT table is granted and may inform the result to the device.

FIG. 8 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable non-transitory media such as resident memory devices, smart cards or other removable memory devices, thereby making a computer program product or article of manufacture according to the embodiments.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   establishing a connection, by an apparatus, with a wireless device having a subset of service information available as default service information, in response to receiving wireless device discovery messages from the wireless device;
   transmitting, by the apparatus, a request for additional service information available from the wireless device;
   receiving, by the apparatus, from the wireless device, additional service information available from the wireless device, if the request is authorized by the wireless device; and
   receiving, by the apparatus, from the wireless device, a subset of service information available from the wireless device, if the request is not authorized by the wireless device;
   wherein the additional service information is a Bluetooth Generic Attribute Profile table of service information and the wireless device discovery messages from the wireless device are Bluetooth Low Energy advertising messages.

2. The method of claim 1, further comprising:
   wherein the wireless device is programmed to provide additional service information to a requester, if an authorized request or connection for additional service information is made;
   receiving, by the apparatus, from the wireless device, additional service information available from the wireless device, if an authorized request or connection is made by the apparatus for additional service information; and
   receiving, by the apparatus, from the wireless device, a subset of service information available from the wireless device, if an authorized request or connection is not made by the apparatus for additional service information.

3. The method of claim 2, wherein the authorized request is indicated by at least one of device level authentication and application level authorization.

4. The method of claim 1, wherein the indicating further comprises:
   moving, by the apparatus, to a position within a touch distance from a location of the wireless device; and
   triggering, by the apparatus, a request to the wireless device, for additional service information, in response to moving to the position within the touch distance.

5. The method of claim 1, further comprising:
   wherein the wireless device is programmed to provide additional service information to a requester, if an authorized request or connection for the additional service information is made;
   providing, by the apparatus, to the wireless device, an indication that the apparatus is authorized to request additional service information;
   moving, by the apparatus, to a position within a touch distance from a location of the wireless device; and triggering, by the apparatus, an authorization to the wireless device, for additional service information, in response to moving to the position within the touch distance.

6. The method of claim 5, wherein the authorized request is indicated by at least one of device level authentication and application level authorization.

7. The method of claim 1, further comprising:
creating, by the apparatus, a wireless communications connection with the wireless device, in response to receiving the wireless device discovery messages;
indicating, by the apparatus, to the wireless device, the request for additional service information available from the wireless device;
disconnecting, by the apparatus, the wireless communications connection with the wireless device;
receiving, by the apparatus, second wireless device discovery messages from the wireless device, which include a new address for the wireless device;
creating, by the apparatus, a second wireless communications connection with the wireless device, in response to receiving the second wireless device discovery messages; and
receiving, by the apparatus, from the wireless device, the additional service information available from the wireless device, in response to the indicating.

8. The method of claim 1, further comprising:
creating, by the apparatus, a wireless communications connection with the wireless device, in response to receiving the wireless device discovery messages;
indicating, by the apparatus, to the wireless device, the request for additional service information available from the wireless device; and
receiving, by the apparatus, from the wireless device, the additional service information available from the wireless device, in response to the indicating.

9. A method, comprising:
establishing a connection, by an apparatus, with a wireless device, the apparatus having a subset of service information available as default service information, in response to transmitting wireless device discovery messages;
receiving, by the apparatus, from a wireless device, a request for service information available from the apparatus;
transmitting, by the apparatus, a wireless message to the wireless device, including additional service information available from the apparatus, if the request is received for the additional service information; and
transmitting, by the apparatus, a wireless message to the wireless device, including a subset of service information available from the apparatus, if the request is not received for the additional service information;
wherein the additional service information is a Bluetooth Generic Attribute Profile table of service information and the wireless device discovery messages are Bluetooth Low Energy advertising messages.

10. The method of claim 9, wherein the apparatus is programmed to provide additional service information to a requester, if an authorized request or connection for the additional service information is received;
transmitting, by the apparatus, the additional service information to the wireless device, in response to receiving an authorized request or connection for the additional service information; and transmitting, by the apparatus, a subset of service information to the wireless device, in response to receiving an unauthorized request or connection for the additional service information.

11. The method of claim 10, wherein the authorized request is indicated by at least one of device level authentication and application level authorization.

12. An apparatus, comprising:
at least one processor;
at least one memory including computer program code;
the at least one memory and the computer program code configured to, with the at least one processor, cause the apparatus at least to:
establish a connection with a wireless device having a subset of service information available as default service information, in response to receiving wireless device discovery messages from the wireless device;
transmit a request for additional service information available from the wireless device;
receive from the wireless device, additional service information available from the wireless device, if the request is authorized by the wireless device; and
receive from the wireless device, a subset of service information available from the wireless device, if the request is not authorized by the wireless device;
wherein the additional service information is a Bluetooth Generic Attribute Profile table of service information and the wireless device discovery messages from the wireless device are Bluetooth Low Energy advertising messages.

13. The apparatus of claim 12, further comprising:
wherein the wireless device is programmed to provide additional service information to a requester, if an authorized request or connection for additional service information is made;
the at least one memory and the computer program code configured to, with the at least one processor, cause the apparatus at least to:
receive from the wireless device, additional service information available from the wireless device, if an authorized request or connection is made by the apparatus for additional service information; and
receive from the wireless device, a subset of service information available from the wireless device, if an authorized request or connection is not made by the apparatus for additional service information.

14. The apparatus of claim 13 wherein the authorized request is indicated by at least one of device level authentication and application level authorization.

15. An apparatus, comprising:
at least one processor;
at least one memory including computer program code;
the at least one memory and the computer program code configured to, with the at least one processor, cause the apparatus at least to:
establish a connection with a wireless device, the apparatus having a subset of service information available as default service information, in response to transmitting wireless device discovery messages;
receive from a wireless device, a request for service information available from the apparatus;
transmit a wireless message to the wireless device, including additional service information available from the apparatus, if the request is received for the additional service information; and transmit a wireless message to the wireless device, including a subset of service information available from the apparatus, if the request is not received for the additional service information;

wherein the additional service information is a Bluetooth Generic Attribute Profile table of service information and the wireless device discovery messages are Bluetooth Low Energy advertising messages.

16. The apparatus of claim 15, wherein the apparatus is programmed to provide additional service information to a requester, if an authorized request or connection for the additional service information is received;

the at least one memory and the computer program code configured to, with the at least one processor, cause the apparatus at least to:

transmit the additional service information to the wireless device, in response to receiving an authorized request or connection for the additional service information; and transmit a subset of service information to the wireless device, in response to receiving an unauthorized request or connection for the additional service information.

17. The apparatus of claim 16, wherein the authorized request is indicated by at least one of device level authentication and application level authorization.

18. A computer program product comprising computer executable program code recorded on a computer readable non-transitory storage medium, the computer executable program code comprising:

code for establishing a connection, by an apparatus, with a wireless device having a subset of service information available as default service information, in response to receiving wireless device discovery messages from the wireless device;

code for transmitting, by the apparatus, a request for additional service information available from the wireless device;

code for receiving, by the apparatus, from the wireless device, additional service information available from the wireless device, if the request is authorized by the wireless device; and code for receiving, by the apparatus, from the wireless device, a subset of service information available from the wireless device, if the request is not authorized by the wireless device;

wherein the additional service information is a Bluetooth Generic Attribute Profile table of service information and the wireless device discovery messages from the wireless device are Bluetooth Low Energy advertising messages.

19. A computer program product comprising computer executable program code recorded on a computer readable non-transitory storage medium, the computer executable program code comprising:

code for establishing a connection, by an apparatus, with a wireless device, the apparatus having a subset of service information available as default service information, in response to transmitting wireless device discovery messages;

code for receiving, by the apparatus, from a wireless device, a request for service information available from the apparatus;

code for transmitting, by the apparatus, a wireless message to the wireless device, including additional service information available from the apparatus, if the request is received for the additional service information; and code for transmitting, by the apparatus, a wireless message to the wireless device, including a subset of service information available from the apparatus, if the request is not received for the additional service information;

wherein the additional service information is a Bluetooth Generic Attribute Profile table of service information and the wireless device discovery messages are Bluetooth Low Energy advertising messages.

\* \* \* \* \*